United States Patent
Bundren et al.

(10) Patent No.: US 8,790,556 B2
(45) Date of Patent: Jul. 29, 2014

(54) PROCESS OF MAKING TRI-ARC FILAMENTS

(75) Inventors: Christopher M. Bundren, Blacksburg, VA (US); Lawton E. Kizer, Blacksburg, VA (US); Denis G. Fallon, Blacksburg, VA (US); Lixin Xue, Ningbo (CN)

(73) Assignee: Celanese Acetate LLC, Irving, TX (US)

( * ) Notice: Subject to any disclaimer, the term of this patent is extended or adjusted under 35 U.S.C. 154(b) by 0 days.

(21) Appl. No.: 13/557,962

(22) Filed: Jul. 25, 2012

(65) Prior Publication Data

US 2014/0026910 A1 Jan. 30, 2014

(51) Int. Cl.
*D01D 5/253* (2006.01)
*D02G 1/00* (2006.01)

(52) U.S. Cl.
USPC ... 264/103; 264/168; 264/177.13; 264/178 F; 264/187; 264/203; 264/207; 264/211.12; 264/211.14

(58) Field of Classification Search
USPC ......... 264/103, 130, 168, 177.13, 178 F, 187, 264/203, 207, 211.12, 211.14
See application file for complete search history.

(56) References Cited

U.S. PATENT DOCUMENTS

| | | | | |
|---|---|---|---|---|
| 2,829,027 A | * | 4/1958 | Raynolds et al. | 264/177.13 |
| 3,120,692 A | * | 2/1964 | Crawford et al. | 264/168 |
| 3,219,043 A | | 11/1965 | Erlich et al. | |
| 3,226,795 A | * | 1/1966 | Swerdloff et al. | 264/177.13 |
| 4,054,709 A | * | 10/1977 | Belitsin et al. | 264/177.13 X |
| 4,087,478 A | * | 5/1978 | Keil | 525/477 |
| 5,047,180 A | | 9/1991 | Steiner et al. | |
| 5,057,368 A | | 10/1991 | Largman et al. | |
| 5,064,949 A | | 11/1991 | Steiner et al. | |
| 5,707,737 A | | 1/1998 | Mori et al. | |
| 5,913,311 A | | 6/1999 | Ito et al. | |
| 6,907,885 B2 | | 6/2005 | Xue et al. | |
| 7,585,441 B2 | | 9/2009 | Caenen et al. | |
| 7,610,852 B2 | | 11/2009 | Bundren et al. | |
| 2008/0127988 A1 | * | 6/2008 | Grubbs et al. | 131/345 |
| 2008/0295853 A1 | | 12/2008 | Jones | |
| 2009/0032037 A1 | | 2/2009 | Xue et al. | |
| 2012/0017925 A1 | | 1/2012 | Sebastian et al. | |

FOREIGN PATENT DOCUMENTS

| | | |
|---|---|---|
| EP | 2272999 A2 | 1/2011 |
| JP | 05078904 B2 | 11/2012 |
| KR | 10-0159055 B1 | 12/1998 |
| WO | 2004061168 A2 | 7/2004 |
| WO | 2014018492 A1 | 1/2014 |

OTHER PUBLICATIONS

International Search Report and Written Opinion for PCT/US2013/051480 dated Oct. 18, 2013.
International Search Report and Written Opinion for PCT/US2013/051603 dated Oct. 18, 2013.

* cited by examiner

*Primary Examiner* — Leo B Tentoni
(74) *Attorney, Agent, or Firm* — McDermott Will & Emery LLP; Jaimes Sher

(57) ABSTRACT

A spinneret having tri-arc holes may be used to produce tri-arc filaments. In some instances, tri-arc holes have a Y-shape with three prongs and each prong having an arc at the end of the prong that tapers from the end of the arc to a connection point of an adjacent arc, and tri-arc filaments have a generally-Y shape cross-section with bulbous or arcing tips. Further, tri-arc filaments may be useful in a plurality of applications including, but not limited to, filters, filters comprising particulate additives, and smoking device filters.

19 Claims, 21 Drawing Sheets

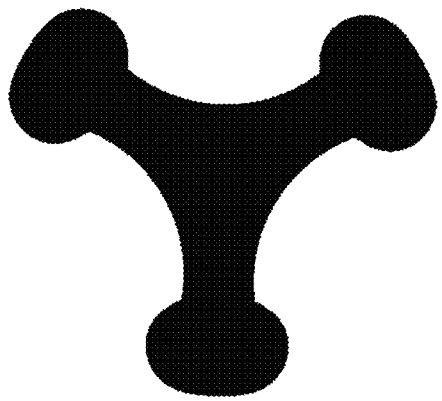
Figure 2C
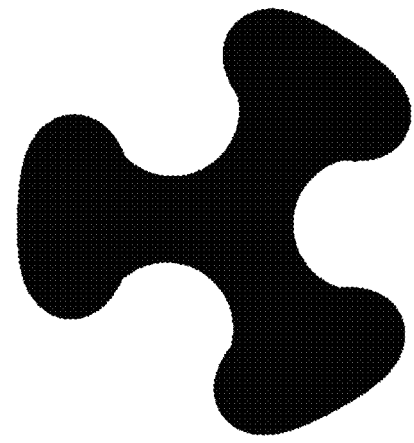
Figure 2B
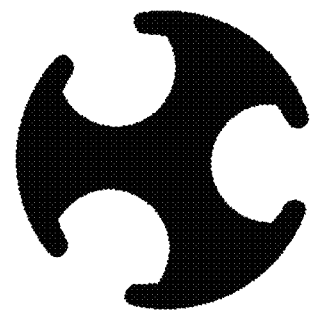
Figure 2E
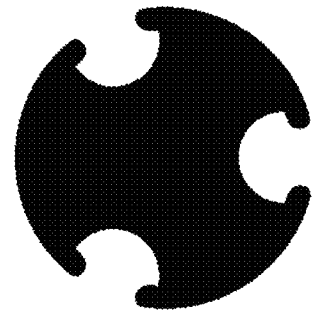
Figure 2D
Figure 2A

PROCESS OF MAKING TRI-ARC FILAMENTS

BACKGROUND

The present invention relates to a spinneret having tri-arc holes and tri-arc filaments produced therefrom, including the methods thereof and articles made therefrom.

In relation to smoking devices, increasing the filtration efficacy may be achieved in at least two ways. First, by increasing the surface area of cellulose acetate filaments within the smoking device filters. For example, many smoking device filters now utilize cellulose acetate filaments having a Y-shaped cross-section rather than a substantially circular cross-section, e.g., a crenulated cross-section, to enhance the surface area. Additionally, smaller diameter, i.e., lower denier per filament ("dpf"), cellulose acetate filaments have been used as a way to increase surface area. However, as the cross-sectional shape and diameter of the cellulose acetate filaments are changed, the firmness and stiffness of the smoking device filters produced therefrom may change, which provides for a different feel to the consumer. Generally, any change to the feel, taste, or draw strength of smoking devices are not readily accepted by consumers.

A second avenue being pursued to increase the filtration efficacy in smoking devices is by adding increasing amounts of additives that absorb or react with components of smoke. For example, carbon or activated carbon has been used in smoking device filters to reduce vapor phase constituents of the smoke. Commonly, the carbon in granular form is sprinkled onto plasticized cellulose acetate tow as the tow is being gathered into the formation of a continuous filter rod. Therefore, the granulated carbon is being held in place only by the plasticizer on the cellulose acetate filaments. However, at moderate to higher concentrations, particulates may not be fully immobilized, which may lead to particulates escaping the filter area and being inhaled by the consumer.

Therefore, cellulose acetate filaments that increase surface area and enhance additive immobilization may be of use to one of ordinary skill in the art.

SUMMARY OF THE INVENTION

The present invention relates to a spinneret having tri-arc holes and tri-arc filaments produced therefrom, including the methods thereof and articles made therefrom.

One embodiment of the present invention provides for a spinneret comprising: a plurality of tri-arc holes having a Y-shape with three prongs and each prong having an arc at the end of the prong that tapers from the end of the arc to a connection point of an adjacent arc.

Another embodiment of the present invention provides for a spinneret comprising: a plurality of multi-arc holes having a Y-shape with at least two prongs and each prong having an arc at the end of the prong that tapers from the end of the arc to a connection point of an adjacent arc.

Yet another embodiment of the present invention provides for a system comprising: a dope reservoir; and a spinneret in fluid communication with the dope reservoir, the spinneret having a plurality of tri-arc holes.

Another embodiment of the present invention provides for a filament comprising: a polymer; and having a tri-arc cross-section having a generally-Y shape cross-section having bulbous or arcing tips.

One embodiment of the present invention provides for a filament comprising: a polymer; and having a multi-arc cross-section having a cross-sectional shape with at least two prongs having bulbous or arcing tips.

Yet another embodiment of the present invention provides for a method comprising: providing a dope comprising a polymer and a solvent; and spinning a plurality of tri-arc filaments from the dope through a spinneret having a plurality of tri-arc holes, the tri-arc filaments having a generally-Y shape cross-section having bulbous or arcing tips.

One embodiment of the present invention provides for a method comprising: providing a dope comprising a polymer and a solvent; and spinning a plurality of multi-arc filaments from the dope through a spinneret having a plurality of multi-arc holes, the multi-arc filaments having a cross-sectional shape with at least two prongs having bulbous or arcing tips.

Another embodiment of the present invention provides for a filter comprising: a plurality of tri-arc filaments having a generally-Y shape cross-section having bulbous or arcing tips.

Yet another embodiment of the present invention provides for a method comprising: providing a bale of crimped tow band that comprises tri-arc filaments having a generally-Y shape cross-section having bulbous or arcing tips; and placing the crimped tow band in an apparatus so as to form a filter rod.

One embodiment of the present invention provides for a smoking device comprising: a smokeable substance; and a filter in fluid communication with the smokeable substance, the filter comprising a plurality of tri-arc filaments having a generally-Y shape cross-section having bulbous or arcing tips.

Another embodiment of the present invention provides for a smoking device comprising: a filter comprising a plurality of tri-arc filaments having a generally-Y shape cross-section having bulbous or arcing tips; and a housing capable of maintaining a smokeable substance in fluid communication with the filter.

One embodiment of the present invention provides for a pack of filters comprising: a pack comprising at least one filter having a plurality of tri-arc filaments having a generally-Y shape cross-section having bulbous or arcing tips.

Another embodiment of the present invention provides for a pack of smoking devices comprising: a pack comprising at least one smoking device that comprises a filter comprising a plurality of tri-arc filaments having a generally-Y shape cross-section having bulbous or arcing tips.

Yet another embodiment of the present invention provides for a carton of smoking device packs comprising: a carton comprising at least one pack, the pack comprising at least one smoking device that comprises a filter that comprises a filter comprising a plurality of tri-arc filaments having a generally-Y shape cross-section having bulbous or arcing tips.

One embodiment of the present invention provides for a method of smoking a smoking device, the method comprising: heating or lighting a smoking device to form smoke, wherein the smoking device comprises at least one filter section comprising a plurality of tri-arc filaments having a generally-Y shape cross-section having bulbous or arcing tips; and drawing the smoke through the smoking device.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combina- FIGS. 1A-D provide illustrations of nonlimiting examples of different tri-arc hole configurations according to some embodiments of the present invention.

FIGS. 2A-E provide illustrations of nonlimiting examples of tri-arc filament cross-sections according to some embodiments of the present invention.

DETAILED DESCRIPTION

The present invention relates to a spinneret having tri-arc holes and tri-arc filaments produced therefrom, including the methods relating thereto and articles made therefrom.

As used herein the term "tri-arc hole" refers to a Y-shape with three prongs and each prong having an arc at the end of the prong that tapers from the end of the arc to a connection point of an adjacent arc. FIGS. 1A-D provide illustrations of nonlimiting examples of different tri-arc hole configurations.

As used herein, the term "tri-arc filament" refers to a generally-Y shape cross-section (i.e., a three-tip filament) having bulbous or arcing tips. FIGS. 2A-C provide illustrations of nonlimiting examples of tri-arc filaments having bulbous tips. FIGS. 2D-E provide illustration of nonlimiting examples of tri-arc filaments having arcing tips. It should be noted, that while the illustrations provide substantially similar tips, it is within the scope of this invention that the tips at each end be of different sizes and/or shapes.

The present invention provides tri-arc filaments that may advantageously have higher surface area than their Y-shaped filament counterparts. Further, the bulbous tips of the tri-arc filaments may provide a type of hook or grip that enhances immobilization of particulate and particulate-like additives in articles made therefrom.

It should also be noted that the filaments and processes described herein relate to dope spinning (wet or dry spinning), which is distinct from spinning filaments from a polymer melt. For example, when forming filaments from a dope, as the filaments are being spun and drawn down, the solvent evaporates, leaving behind the filament composition (e.g., polymer and additives). When the solvent evaporates, the size and shape of the filament changes from the shape of the die from which they are spun. In dope spinning processes, the parameters of solvent evaporation, inter alia, translate to the size, shape, and mechanical properties of the resultant filaments. In polymer melt processes (e.g., via spunbond or meltblown processes), the polymer is melted, extruded, and cooled so as to form the filament. These processes generally provide for filaments to be produced having the same or substantially the same shape and size as the die from which they are spun. Therefore, the knowledge of polymer melt spinning processes does not necessarily translate to the processes for dope spinning.

Figure 1A:
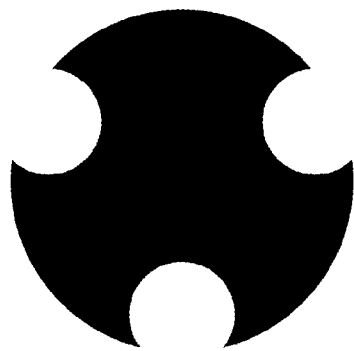
Figure 1B:
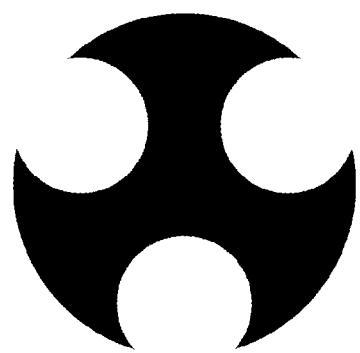
Figure 1C:
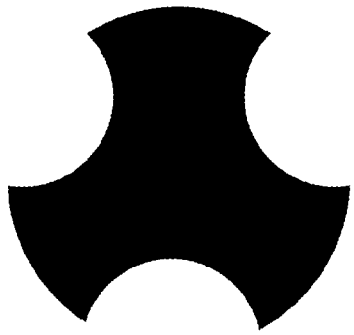
Figure 1D:
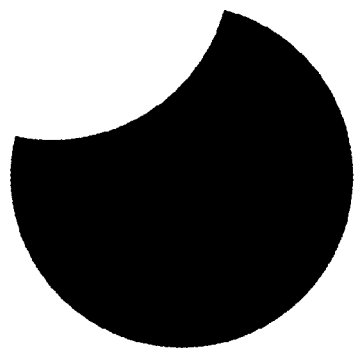
Figure 3A:
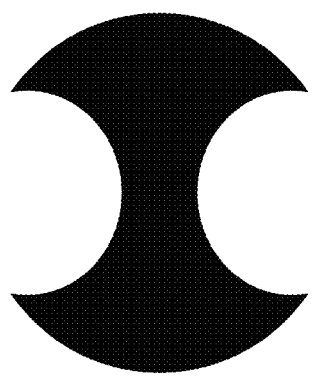
FIGS. 3A-B provide illustrations of nonlimiting examples of bi-arc and tetra-arc hole configurations, respectively, according to some embodiments of the present invention.
Figure 3B:
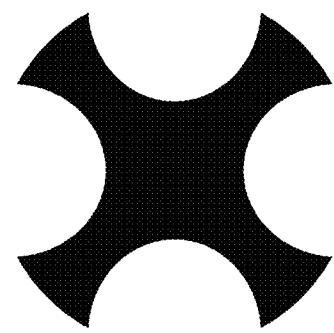
Figure 4A:
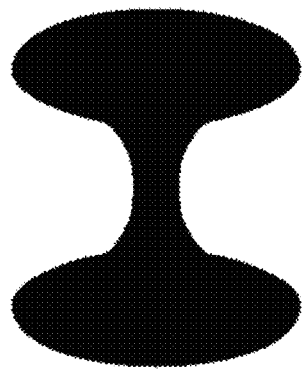
FIGS. 4A and 4C and FIGS. 4B and 4D provide illustrations of nonlimiting examples of filament cross-sections having a bi-lobal and tetra-lobal shape, respectfully, according to some embodiments of the present invention.
Figure 4B:
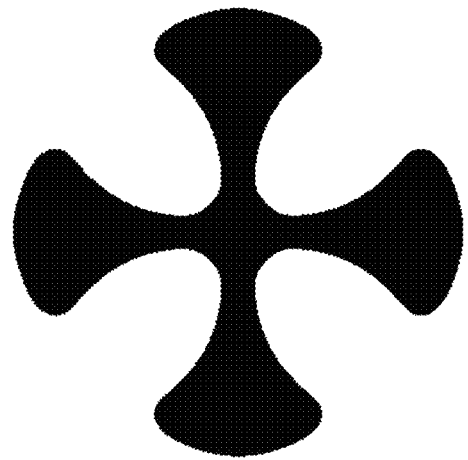
Figure 4C:
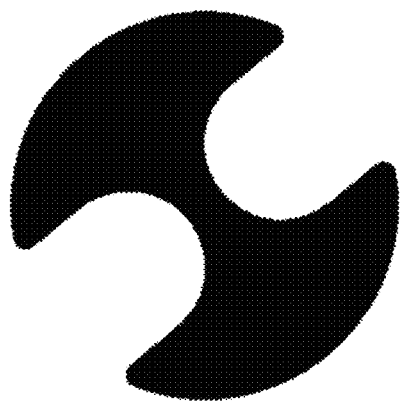
Figure 4D:
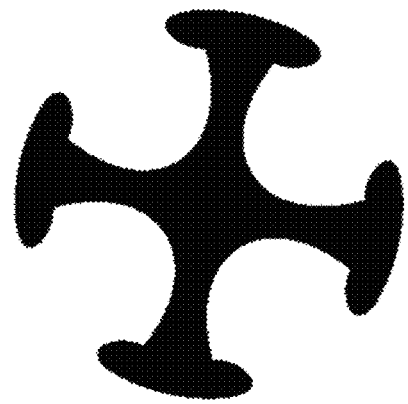

Within the scope of the present invention includes potential modifications to the spinneret and resultant filaments produced therefrom. FIGS. 3A-B provide various spinneret hole design modifications, and FIGS. 4A-B provide various filament cross-sections that may be produced from said hold designs. By way of nonlimiting example, FIG. 3A provides a straight hole with arcs at the two ends, which may produce bi-lobal filaments illustrated in FIG. 4A. By way of nonlimiting example, FIG. 3B provides a four-prong hole with arcs at each end, which may produce tetra-lobal filaments illustrated in 4B. For simplicity, as used herein the terms tri-arc holes and tri-arc filaments will be used in describing embodiments of the present invention. However, in some embodiments, other hole cross-sections (e.g., bi-arc and tetra-arc) may be interchanged with tri-arc holes, and accordingly other filament cross-sections (e.g., bi-arc and tetra-arc) may be interchanged with tri-arc filaments. As used herein, the term "multi-arc" in reference to either holes or filaments refers to holes or filaments with at least two arcs thereby encompassing at least bi-arc, tri-arc, tetra-arc, and so on.

It should be noted that when "about" is provided below in reference to a number in a numerical list, the term "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

I. Tri-Arc Filament Production and Tow Bands Thereof

Generally, the production of filaments may involve spinning filaments from a dope. Further, the filaments may then be further processed into tow bands for transportation, storage, and/or further use. Generally, the production of a bale of tow bands may involve spinning filaments from a dope, forming a tow band from the filaments, crimping the tow band, and baling the crimped tow band. Within said production of bales, optional steps may include, but are not limited to, warming the filaments after spinning, applying a finish or additive to the filaments and/or tow band prior to crimping, and conditioning the crimped tow band. It should be noted that bales may vary in size and shape as needed for further processing.

It should also be noted that spinning filaments from a dope is distinct from spinning filaments from a polymer melt. For example, when forming filaments from a dope, as the filaments are being spun and drawn down, the solvent evaporates, leaving behind the filament composition (e.g., polymer and additives). When the solvent evaporates, the size and shape of the filament changes from the shape of the die from which they are spun. In dope spinning processes, the parameters of solvent evaporation, inter alia, translate to the size, shape, and mechanical properties of the resultant filaments. In polymer melt processes (e.g., via spunbond or meltblown processes), the polymer is melted, extruded, and cooled so as to form the filament. These processes generally provide for filaments to be produced having the same or substantially the same shape and size as the die from which they are spun. Therefore, the knowledge of polymer melt spinning processes do not necessarily translate to the processes for dope spinning.

In some embodiments, a spinneret of the present invention may comprise a plurality of tri-arc holes. As used herein, the terms "holes," when used in conjunction with a spinneret design generally refers to openings through which the dope is extruded.

Figure 5A:
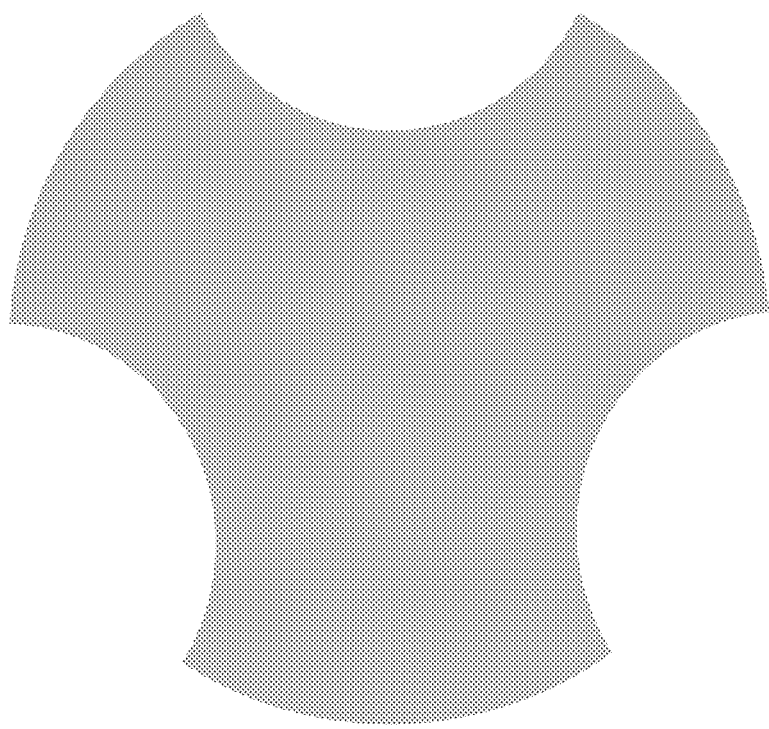
FIGS. 5A-C provide illustrations of the steps in measuring the dimensions of a tri-arc hole using a four-circle approximation method.
Figure 5B:
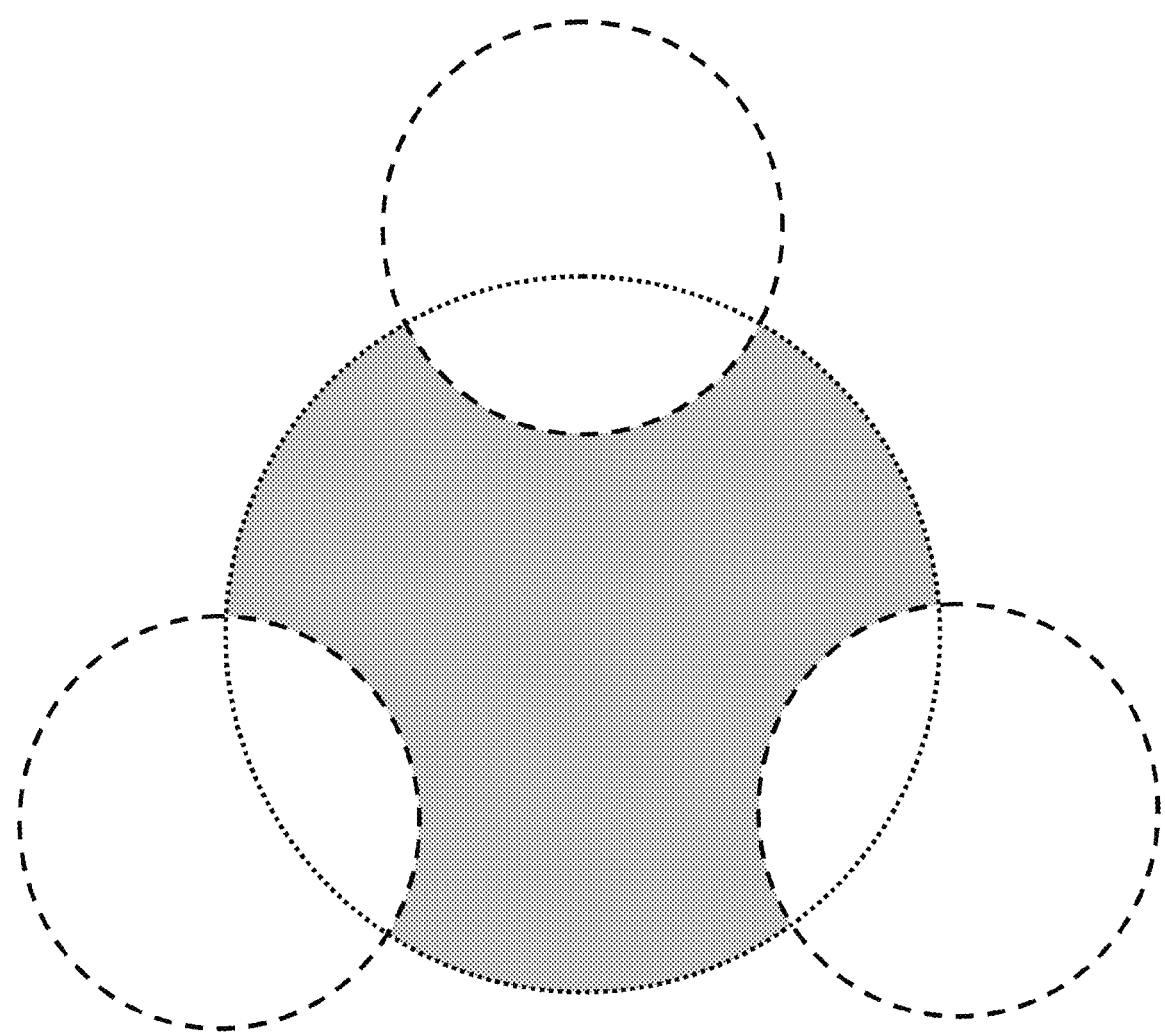
Figure 5C:
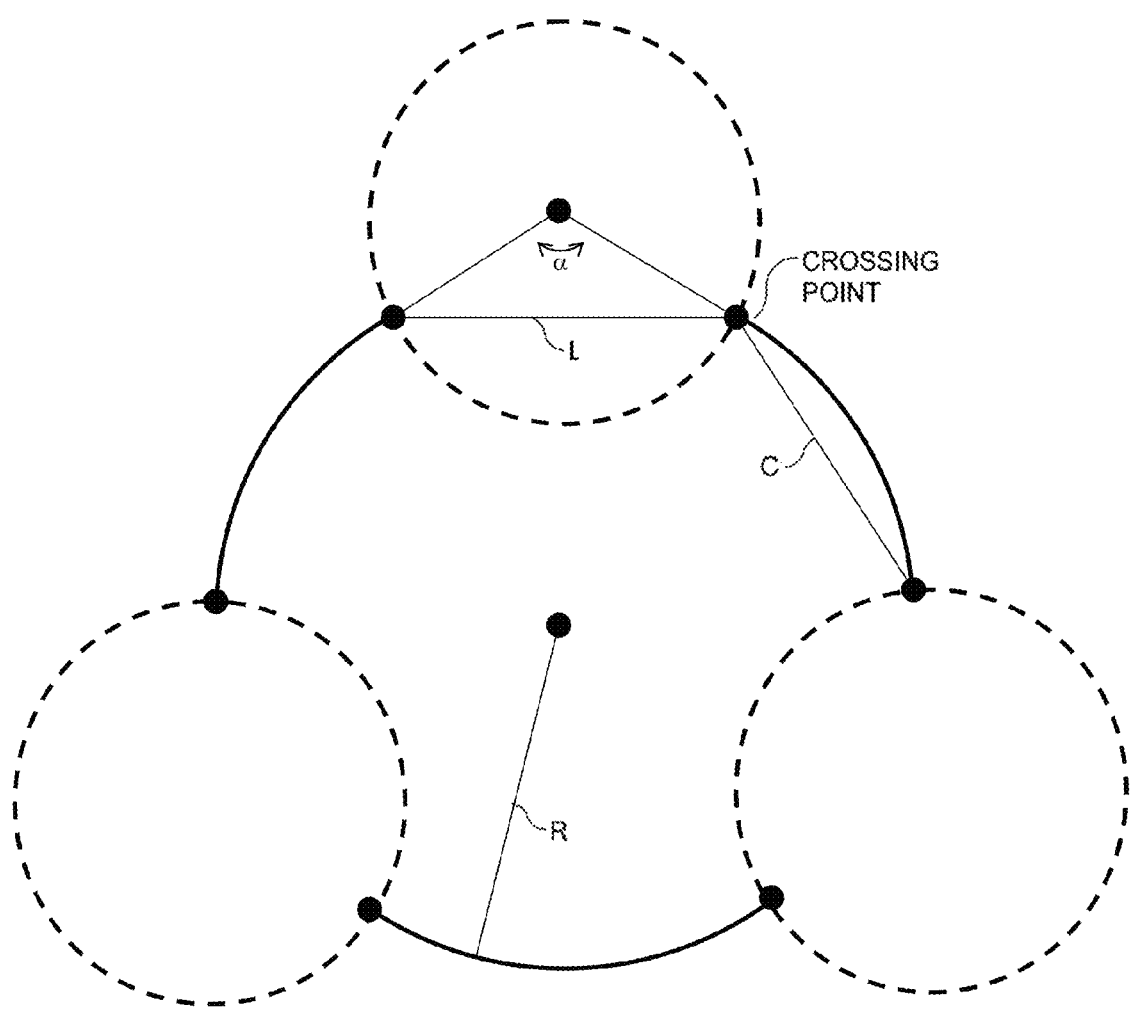

The tri-arc holes may be characterized by a plurality of dimensions including, but not limited to, the radius (R), the arc distance (C), the inter-arc distance (L), the inter-arc angle (α), or any combination thereof. As shown in FIGS. 5A-C, a shape of tri-arc hole (FIG. 5A) can be characterized by a four-circle approximation, where the tri-arc hole is superimposed with four circles (FIG. 5B). One circle provides the circular equivalent of the tri-arc hole and the remaining three circles overlap the circular equivalent of the tri-arc hole so as to form the three prongs and approximate the tapering therebetween. The points where the circular equivalent of the tri-arc hole and the three additional circles cross are referred to as "crossing points," as shown in FIG. 5C. From this four-circle approximation, at least some of the dimensions of the tri-arc hole may be measured, as shown in FIG. 5C. It should be noted that the four-circle approximation may be adjusted to oblong shapes as needed to accommodate the tri-arc hole cross-section.

As used herein, the radius (R) of the tri-arc holes is the distance from the center of the hole to the edge of the arc. In some embodiments, R may range from a lower limit of about 25 microns, 50 microns, 100 microns, or 250 microns to an upper limit of about 500 microns, 400 microns, 300 microns, or 250 microns, wherein R may range from any lower limit to any upper limit and encompass any subset therebetween.

In some embodiments, the ratio of the inter-arc distance to the radius (L/R) may range from a lower limit of about 0.5, 0.6, or 0.7 to an upper limit of about 1.5, 1.2, or 1, wherein L/R may range from any lower limit to any upper limit and encompass any subset therebetween.

In some embodiments, the arc distance (C) may be greater than or equal to the inter-arc distance (L). In some embodiments, the inter-arc distance (L) may be greater than or equal to the arc distance (C). In some embodiments, the ratio of the arc distance to the inter-arc distance (C/L) may range from a lower limit of about 0.2, 0.5, or 1 to an upper limit of about 3, 2, or 1, wherein C/L may range from any lower limit to any upper limit and encompass any subset therebetween.

In some embodiments, the inter-arc angle (a) may range from a lower limit of about 45°, 60°, 75°, or 90° to an upper limit of about 180°, 165°, or 150°, wherein the inter-arc angle may range from any lower limit to any upper limit and encompass any subset therebetween.

It should be noted that one skilled in the art should be able to modify the dimensions from above to achieve the desired shapes of the bi-arc holes, tetra-arc holes, and the like. By way of nonlimiting example, C/L for a bi-arc hole may range from about 0.2 to about 2.

In some embodiments, a spinneret of the present invention may comprise at least two different cross-sectional shaped holes with at least one being a tri-arc hole. In some embodiments, a spinneret of the present invention may comprise at least two different size holes, whether the holes be tri-arc or a mixture of tri-arc and another cross-sectional shape. Examples of other cross-sectional shapes for spinneret holes may include, but are not limited to, circular, substantially circular, ovular, substantially ovular, crescent, multi-lobal, polygonal (e.g., like tripods, tetrapods, stars, triangles, squares, trapezoids, pentagons, hexagons, and so on with sides of even lengths or varying lengths), polygonal with rounded corners, and any hybrid thereof.

In some embodiments, holes may be tapered, e.g., countersinks, with capillary exits. By way of nonlimiting example, a tri-arc hole may comprise a countersink and a capillary exit where the capillary exit as the tri-arc hole shape as described herein and countersink may or may not have a similar tri-arc hole shape (e.g., a tapering that begins from circular and meets the capillary in the tri-arch hole shape). Tapering may be at a constant angle or at more than one angle. In some embodiments tri-arc holes may be tapered for a constant accelerated entry, i.e., a smooth transition from one angle to another. In some embodiments, holes within a single spinneret may have different tapering angles.

The spinneret design and/or spinning parameters may affect the rate at which the solvent evaporates from the filament, which may affect, inter alia, the size, cross-sectional shape, strength, and processability of the filaments produced. One skilled in the art with the benefit of this disclosure should understand the influence of the spinneret design and/or parameters on the filaments produced therefrom. By way of nonlimiting example, for the production of filaments with a higher denier per filament ("dpf"), described further herein, it may be advantageous to have a spinneret with holes spaced further apart as compared to lower dpf filaments. Further, for the production of higher dpf filaments, it may be advantageous to design the spinneret with hole placement in a donut configuration, which may assist with proper drying of the filaments during spending. As used herein, "donut configuration" refers to any shape (circular, ovular, polygonal, and the like) having a void in the middle, wherein the void does not have holes for extrusion.

In some embodiments, a spinneret of the present invention may have a cup diameter of about 16 cm or less. As used herein, the term "cup" refers to the reservoir which holds or is integral to the plate of the spinneret comprising the holes, which may be concave, convex, or flat. In some embodiments, a spinneret of the present invention may have a cup diameter ranging from a lower limit of about 1 cm, 3 cm, or about 5 cm to an upper limit of about 16 cm, 13 cm, 10 cm, or 8 cm, wherein the cup diameter may range from any upper limit to any lower limit and encompass any subset therebetween. Nonlimiting examples of suitable cups may be constructed of metal alloys, may be plated, ceramics, glass, polymers, composites, and the like, any hybrid thereof, or any combination thereof. One skilled in the art with the benefit of this disclosure should understand that the thickness of the plate of the spinneret may depend on, inter alia, the size of the cup and the material that the top and/or plate are constructed from.

In some embodiments, the distance between tri-arc holes of the plate may range from a lower limit of about 1 mm or 2 mm to an upper limit of about 5 mm or 3 mm, wherein the distance between tri-arc holes may range from any lower limit to any upper limit and encompass any subset therebetween. One skilled in the art with the benefit of this disclosure should understand that the distance between tri-arc holes may be greater than 5 mm or less than 1 mm so long as the distance between holes provides the necessary space for solvent evaporation. By way of nonlimiting example, the distance between tri-arc holes may be about 1.8 mm (0.070 in).

In some embodiments, filaments of the present invention may have a tri-arc cross-section. In some embodiments, tri-arc filaments of the present invention may have a denier per filament ("dpf") suitable for use in smoking articles. In some embodiments, tri-arc filaments of the present invention may range from a lower limit of about 1 dpf, 2 dpf, 3 dpf, 4 dpf, 5 dpf, 7 dpf, 10 dpf, 11 dpf, 12 dpf, or 13 dpf to an upper limit of about 30 dpf, 25 dpf, 20 dpf, 15 dpf, 10 dpf, 7 dpf, 5 dpf, 4 dpf, or 3 dpf, wherein the dpf of the filaments may range from any upper limit to any lower limit and encompass any subset therebetween. In some embodiments, tri-arc filaments of the present invention may be high dpf filaments, e.g., about 10 dpf or greater. In some embodiments, tri-arc filaments of the present invention may be about 11 dpf or greater. In some embodiments, tri-arc filaments of the present invention may be about 12 dpf or greater. In some embodiments, tri-arc filaments of the present invention may range from about 2 dpf to about 7 dpf, or more preferably about 3 dpf to about 5 dpf.

Figure 6B:
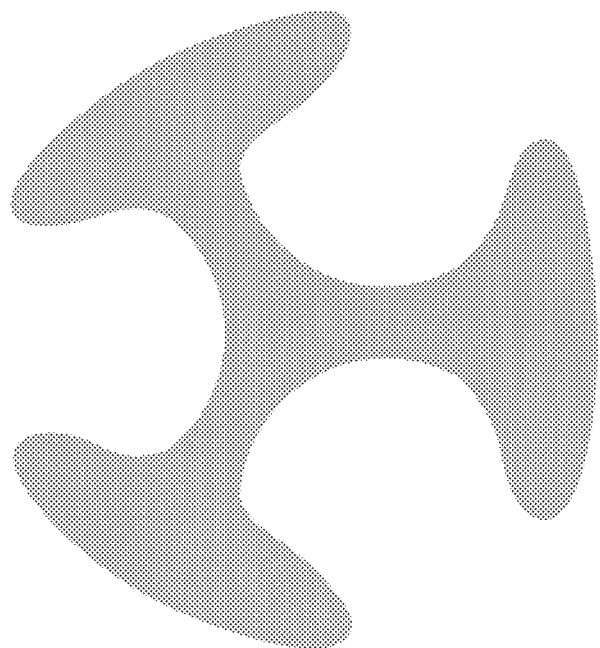
FIGS. 6A-F provide illustrations of the steps in measuring the dimensions of a tri-arc filament using a four-circle approximation method.
Figure 6A:
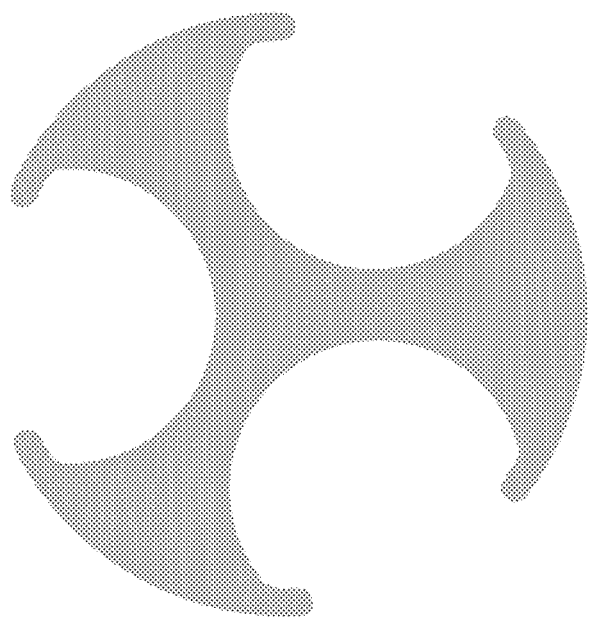
Figure 6D:
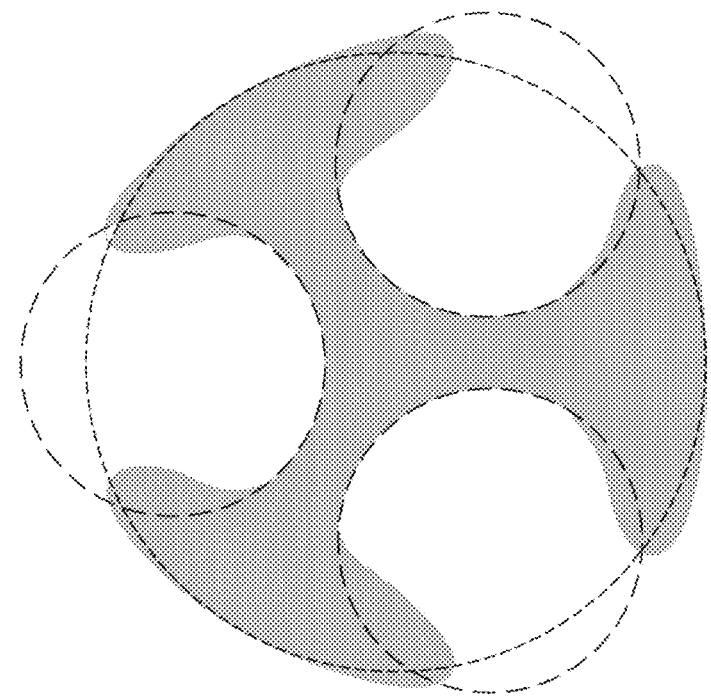
Figure 6C:
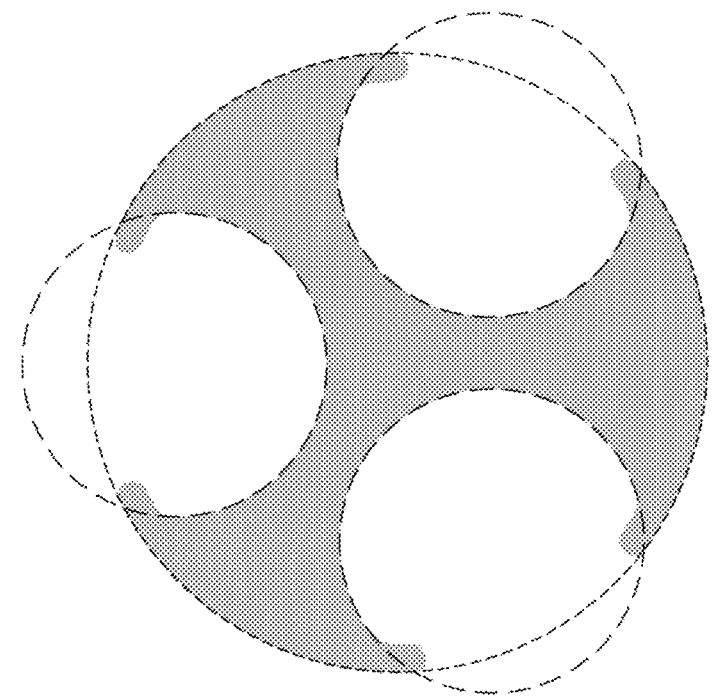
Figure 6F:
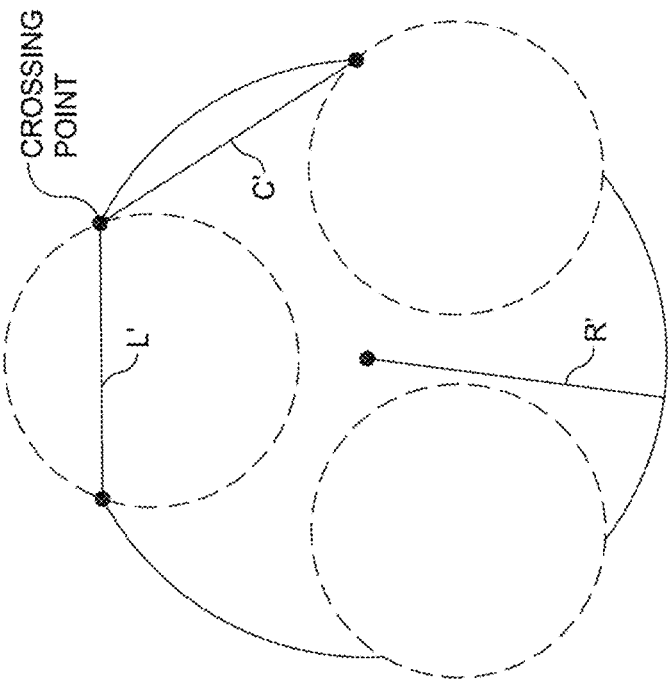
Figure 6E:
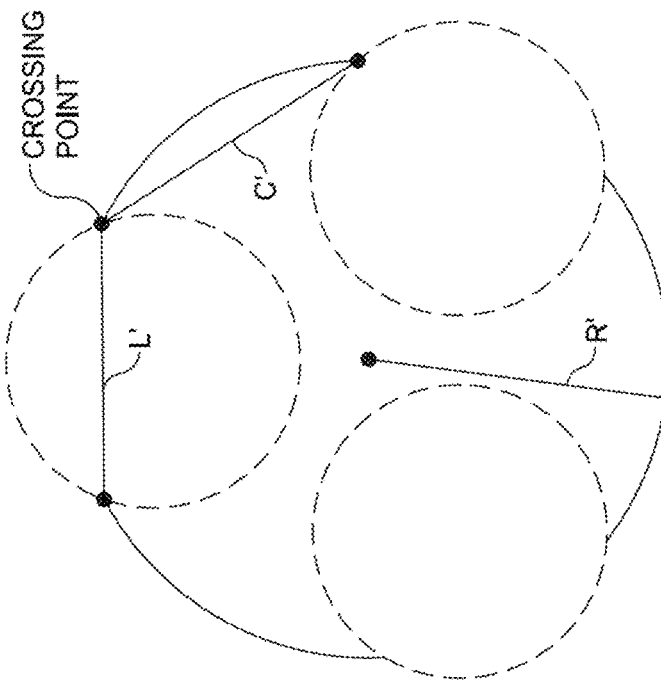

The tri-arc filaments may be characterized by a plurality of dimensions including, but not limited to, the radius (R'), the arc distance (C'), the inter-arc distance (L'), or any combination thereof. As shown in FIGS. 6A-F, a shape of tri-arc filaments (FIGS. 6A-B) can be characterized by a four-circle approximation as was similarly done for tri-arc holes above, where the tri-arc filament is superimposed with four circles (FIGS. 6C-D). One circle provides the circular equivalent of the tri-arc filament and the remaining three circles overlap the circular equivalent of the tri-arc filament so as to form Y-shaped nature of the filament. The points where the circular equivalent of the tri-arc filament and the three additional circles cross are referred to as crossing points, as shown in FIGS. 6E-F. From this four-circle approximation, at least some of the dimensions of the tri-arc filament may be measured, as shown in FIG. 6E-F. It should be noted that the four-circle approximation may be adjusted to oblong shapes as needed to accommodate the tri-arc filament cross-section.

In some embodiments, the radius (R') of the tri-arc filaments, which is dependent, inter alia, on the die radius R, may range from a lower limit of about 10 microns, 25 microns, 50 microns, 100 microns, or 250 microns to an upper limit of about 500 microns, 400 microns, 300 microns, or 250 microns, wherein R' may range from any lower limit to any upper limit and encompass any subset therebetween.

In some embodiments, the ratio of the arc distance to the inter-arc distance (C'/L') may range from a lower limit of about 0.2, 0.5, or 1 to an upper limit of about 3, 2, or 1, wherein C'/L' may range from any lower limit to any upper limit and encompass any subset therebetween.

It should be noted that one skilled in the art should be able to modify the dimensions from above to achieve the desired shapes of the bi-arc filaments, tetra-arc filaments, and the like. By way of nonlimiting example, C'/L' for a bi-arc filament may range from about 0.2 to about 2 depending on, inter alia, the dimensions of the corresponding bi-arc hole, the dope composition, and the spinning parameters like drawdown ratio and temperature.

Filaments of the present invention may be produced by any method known to one skilled in the art. In some embodiments, filaments of the present invention may be produced by spinning a dope through a spinneret. As used herein, the term "dope" refers to a polymer solution and/or suspension from which filaments are produced. In some embodiments, a dope may comprise polymers and solvents. In some embodiments, a dope for use in conjunction with the present invention may comprise polymers, solvents, and additives. It should be noted that additives are further detailed herein. In some embodiments, the polymer may be at a concentration in the dope ranging from about 20 to about 40 percent by weight. In some embodiments, the dope may be heated to a temperature ranging from about 40° C. to about 100° C.

Suitable polymers for use in conjunction with the present invention may include, but are not limited to, cellulose acetates, cellulose diacetates, cellulose triacetates, cellulose propionates, cellulose butyrates, cellulose acetate-propionates, cellulose acetate-butyrates, cellulose propionate-butyrates, starch acetates, rayon, viscose, and the like, any derivative thereof, any copolymer thereof, and any combination thereof. In some embodiments, suitable cellulose acetates may have a degree of substitution less than about 3 acetyl groups per glucose unit, preferably in the range of about 2.2 to about 2.8, and most preferably in the range of about 2.4 to about 2.6.

Suitable solvents for use in conjunction with the present invention may include, but are not limited to, water, acetone, methylethyl ketone, methylene chloride, dioxane, dimethyl formamide, methanol, ethanol, glacial acetic acid, supercritical $CO_2$, any suitable solvent capable of dissolving the aforementioned polymers, or any combination thereof. By way of nonlimiting example, a solvent for cellulose acetate may be an acetone/water mixture.

In some embodiments, the spinneret comprising tri-arc holes may be a component of a system. Said system may, in some embodiments, comprise a dope reservoir and at least one tri-arc spinneret in fluid communication with the dope reservoir. Optional other elements may include, but are not limited to, filtration elements, heating elements, heat exchangers (e.g., hot water, steam pipes), pumps, mixers, or any combination thereof.

In some embodiments, the spinning parameters for use in conjunction with the present invention may include extruding filaments at a drawdown ratio (i.e., the fiber exit speed to take-up speed ratio) ranging from about 0.6 to about 1.6.

It should be understood by one skilled in the art that extruding does not imply a single method or action for producing the filaments and could be interchanged with, at least, spinning, expelling, and the like.

In some embodiments, producing tri-arc filaments of the present invention may involve heating the filaments to a temperature at or above about the evaporation temperature of the solvent to assist in removal of the solvent. Heating may be in the form of direct heat, indirect heat, or any combination thereof. Further, heating may involve heaters, heated enclosures (e.g., cabinets or tunnels), heated surfaces (e.g., hot shoes), microwaves, irradiation sources that cause additives in the filaments (e.g., nanoparticles) to produce heat, or any combination thereof.

In some embodiments, producing tri-arc filaments of the present invention may involve treating filaments to achieve surface functionality on the filaments. In some embodiments, filaments of the present invention may comprise a surface functionality including, but not limited to, biodegradability sites (e.g., defect sites to increase surface area to enhance biodegradability), chemical handles (e.g., carboxylic acid groups for subsequent functionalization), active particle binding sites (e.g., sulfide sites binding gold particles or chelating groups for binding iron oxide particles), sulfur moieties, or any combination thereof. One skilled in the art should understand the plurality of methods and mechanisms to achieve surface functionalities. Some embodiments may involved dipping, spraying, ionizing, functionalizing, acidizing, hydrolyzing, exposing to a plasma, exposing to an ionized gas, or any combination thereof to achieve surface functionalities. In some embodiments, suitable chemicals to impart a surface functionality may be any chemical or collection of chemicals capable of reacting with cellulose acetate including, but not limited to, acids (e.g., sulfuric acid, nitric acid, acetic acid, hydrofluoric acid, hydrochloric acid, and the like), reducing agents (e.g., LiAlH$_4$, NaBH$_4$, H$_2$/Pt, and the like), Grignard reagents (e.g., CH$_3$MgBr, and the like), transesterification reagent, amines (e.g., R—NH$_3$ like CH$_3$NH$_3$), or any combination thereof. Exposure to plasmas and/or ionized gases may react with the surface, produce defects in the surface, or any combination thereof. Said defects may increase the surface area of the filaments which may yield higher loading and/or higher filtration efficacy in the final filter products.

In some embodiments, producing tri-arc filaments of the present invention may involve applying a finish to the filaments. Suitable finishes for use in conjunction with the present invention may include, but are not limited to, at least one of the following: oils (e.g., mineral oils or liquid petroleum derivatives), water, additives, or any combination thereof. Examples of suitable mineral oils may include, but are not limited to, water white (i.e., clear) mineral oil having a viscosity of 80-95 SUS (Sabolt Universal Seconds) measured at 38° C. (100° F.). Examples of suitable emulsifiers may include, but are not limited to, sorbitan monolaurate, e.g., SPAN® 20 (available from Uniqema, Wilmington, Del.) and/or poly(ethylene oxide) sorbitan monolaurate, e.g., TWEEN® 20 (available from Uniqema, Wilmington, Del.). The water may be de-mineralized water, de-ionized water, or otherwise appropriately filtered and treated water.

In some embodiments of the present invention, a finish may be applied to filaments of the present invention as a neat finish or as a finish emulsion in water. As used herein, the term "neat finish" refers to a finish formulation without the addition of excess water. It should be noted that finish formulations may comprise water. In some embodiments, finish may be applied neat to filaments of the present invention followed by applying water separately.

In some embodiments of the present invention, a finish emulsion may comprise less than about 98% water, less than about 95%, less than about 92%, or less than about 85%. In some embodiments, it may be advantageous in later steps to have filaments having a lower weight percentage of moisture (e.g., about 5% to 25% w/w of the tow band), of which water of the finish can be a contributor. The water content of the finish emulsion may be at least one parameter that may assist in achieving said weight percentage of moisture in the filaments. Therefore, in some embodiments, a finish emulsion may comprise less than about 92% water, less than about 85% water, or less than about 75% water.

In some embodiments, tri-arc filaments of the present invention may have higher water retention characteristics than Y-shaped filaments of a corresponding total denier. In some embodiments, tri-arc filaments of the present invention may have higher water retention characteristics than Y-shaped filaments of a corresponding total denier that ranges from a lower limit of about 5% higher, 10% higher, or 20% higher to an upper limit of about 40% higher, 30% higher, or 25% higher, wherein the percent increase in water retention characteristics may range from any lower limit to any upper limit and encompass any subset therebetween.

Some embodiments of the present invention may include forming tow bands from a plurality of tri-arc filaments of the present invention. In some embodiments, a tow band comprising a plurality of tri-arc filaments of the present invention may be about 200,000 total denier or less. In some embodiments, a tow band comprising a plurality of tri-arc filaments of the present invention may be about 100,000 total denier or less. In some embodiments, a tow band comprising a plurality of tri-arc filaments of the present invention may be about 20,000 total denier or less. In some embodiments, tow bands comprising a plurality of tri-arc filaments of the present invention may have a total denier ranging from a lower limit of about 1,000 total denier, 5,000 total denier, 10,000 total denier, 20,000 total denier, or 50,000 total denier to an upper limit of about 200,000 total denier, 150,000 total denier, 100,000 total denier, 50,000 total denier, 20,000 total denier, 10,000 total denier, or 9,000 total denier, and wherein the total denier may range from any upper limit to any lower limit and encompass any subset therebetween. In some embodiments, tow bands comprising a plurality of high dpf tri-arc filaments (e.g., 10 dpf or higher) of the present invention may advantageously have a total denier ranging from a lower limit of about 1,000 total denier, 1,500 total denier, 2,500 total denier, or 5,000 total denier to an upper limit of about 20,000 total denier, 15,000 total denier, 10,000 total denier, or 9,000 total denier, and wherein the total denier may range from any upper limit to any lower limit and encompass any subset therebetween. In some embodiments, tow bands comprising a plurality of about 3 dpf to about 5 dpf tri-arc filaments of the present invention may advantageously have a total denier ranging from about 20,000 total denier to about 40,000 total denier.

In some embodiments of the present invention, a tow band may comprise more than one type of filament where at least some of the filaments are tri-arc filaments of the present invention. In some embodiments, the more than one type of filament may vary based on dpf, cross-sectional shape, composition, treatment prior to forming the tow band, or any combination thereof. Examples of suitable additional filaments may include, but are not limited to, cellulose acetate filaments, filaments of any of the compositions described above (e.g., filaments comprising cellulose diacetates, cellulose triacetates, cellulose propionates, cellulose butyrates, cellulose acetate-propionates, cellulose acetate-butyrates, cellulose propionate-butyrates, starch acetates, acrylonitriles, vinyl chlorides, vinyl esters, vinyl ethers, or any combination thereof), carbon filaments, activated carbon filaments, natural fibers, synthetic filaments, or any combination thereof. Examples of other filament cross-section may include, but are not limited to, circular, substantially circular, crenulated, ovular, substantially ovular, polygonal, substantially polygonal, dog-bone, "Y," "X," "K," "C," multi-lobe other than tri-arc, and any hybrid thereof.

Some embodiments of the present invention may include crimping tow bands comprising tri-arc filaments of the present invention to form a crimped tow band. Crimping tow bands comprising tri-arc filaments of the present invention may involve using any suitable crimping technique known to those skilled in the art. These techniques may include a variety of apparatuses including, but not limited to, a stuffer box or a gear. Nonlimiting examples of crimping apparatuses and the mechanisms by which they work can be found in U.S. Pat. Nos. 7,610,852 and 7,585,441, the relevant disclosures of which are incorporated herein by reference. Suitable stuffer box crimpers may have smooth crimper nip rolls, threaded or grooved crimper nip rolls, textured crimper nip rolls, upper flaps, lower flaps, or any combination thereof.

Figure 7:
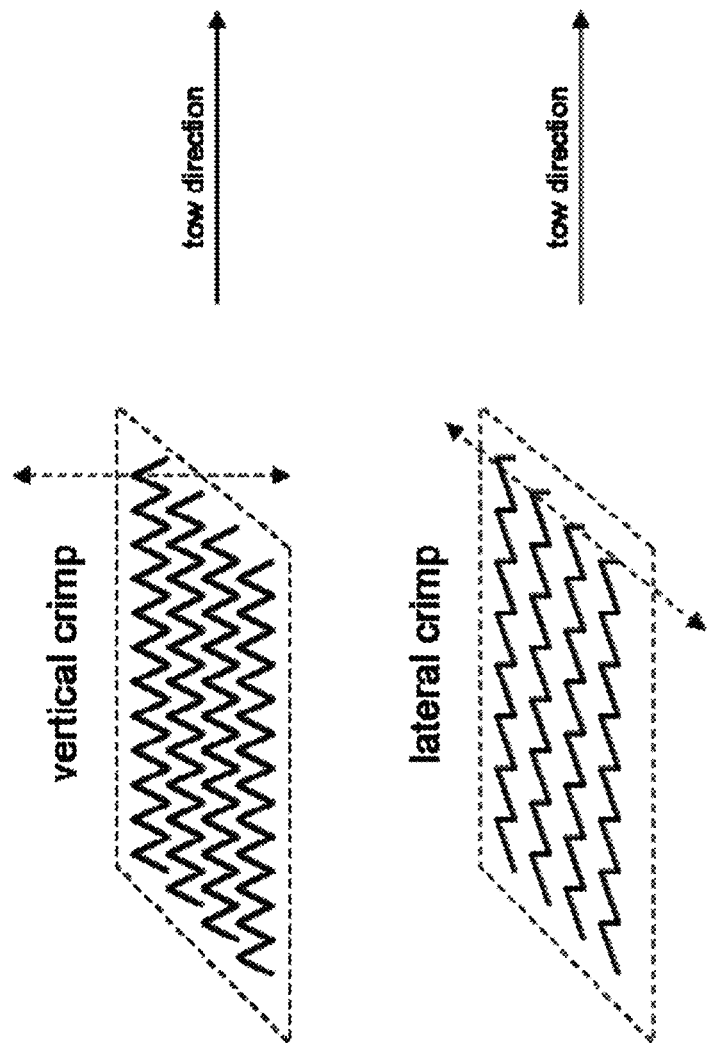
FIG. 7 provides an illustration of lateral and vertical crimps for tow bands.

The configuration of the crimp of the tow bands comprising tri-arc filaments of the present invention may play a role in the processability of the final bale. Examples of crimp configurations may include, but are not limited to, lateral, substantially lateral, vertical, substantially vertical, some degree between lateral and vertical, random, or any combination thereof. As used herein, the term "lateral" when describing crimp orientation refers to crimp or fiber bends substantially in the plane of the tow band, see FIG. 7. As used herein, the term "vertical" when describing a crimp orientation refers to crimp projecting substantially outside of the plane of the tow band and substantially perpendicular to the plane of the tow band, see FIG. 7. It should be noted that the terms lateral and vertical refer to general overall crimp orientation and may have deviation from said configuration by +/− about 30 degrees. As used herein, "substantially" modifying lateral or vertical should be taken to mean within a deviation from said configuration of +/− about 45 degrees.

In some embodiments, a crimped tow band comprising tri-arc filaments of the present invention may have filaments with a first crimp configuration and filaments with a second crimp configuration.

In some embodiments, a crimped tow band comprising tri-arc filaments of the present invention may have filaments with at least a substantially vertical crimp configuration near the edges and filaments with at least a substantially lateral crimp configuration near the center. In some embodiments a crimped tow band comprising tri-arc filaments of the present invention may have filaments with a vertical crimp configuration near the edges and filaments with a lateral crimp configuration near the center.

The configuration of the crimp may be important for the processability of the final bale in subsequent processing steps. By way of nonlimiting example, a lateral and/or substantially lateral crimp configuration may provide better cohesion of tri-arc filaments, and optionally additional filaments, with a higher dpf in a low total denier tow band as compared to a vertical and/or substantially vertical crimp configuration unless further steps are taken to enhance cohesion.

The processing parameters to achieve lateral crimping, cohesion additives, and additional processing parameters (e.g., heat) that may be used in conjunction with the production of high dpf, low total denier tow band comprising tri-arc filaments can be found in U.S. patent application Ser. No. 13/288,204 entitled "High Denier Per Filament and Low Total Denier Tow Bands" and Ser. No. 13/288,261 entitled "Products of High Denier Per Filament and Low Total Denier Tow Bands" both filed Nov. 3, 2011, the entire disclosures of which are incorporated herein by reference.

Further, some embodiments may involve heating the tow bands comprising tri-arc filaments of the present invention before, after, and/or during crimping. While said heating may be used in conjunction with any crimp configuration, it may be advantageous to use said heating with a vertical and/or substantially vertical crimp configuration. Said heating may involve exposing the filaments of the tow band to steam, aerosolized compounds (e.g., plasticizers), liquids, heated fluids, direct heat sources, indirect heat sources, irradiation sources that causes additives in the filaments (e.g., nanoparticles) to produce heat, or any combination thereof.

Some embodiments may include conditioning the crimped tow band comprising tri-arc filaments of the present invention. In some embodiments, conditioning may be used to achieve a crimped tow band having a residual acetone content of about 1% or less w/w of the crimped tow band. Conditioning may be used to achieve a crimped tow band having a residual water content of about 8% or less w/w of the crimped tow band. In some embodiments Conditioning may, in some embodiments, involve exposing the filaments of the crimped tow band to steam, aerosolized compounds (e.g., plasticizers), liquids, heated fluids, direct heat sources, indirect heat sources, irradiation sources that causes additives in the filaments (e.g., nanoparticles) to produce heat, or any combination thereof.

Some embodiments of the present invention may include baling the crimped tow band comprising tri-arc filaments of the present invention to produce a bale comprising tri-arc filaments of the present invention. In some embodiments, baling may involve placing, e.g., laying, depositing, or arranging, the crimped tow band comprising tri-arc filaments of the present invention in a can in a pattern. It should be noted that can is used generically to refer to a container that may be in any shape, preferably square or rectangle, and of any material. As used herein, the term "pattern" refers to any design which may or may not change during placing. In some embodiments of the present invention, the pattern may be substantially zig-zag having a periodicity of about 0.5 cycles/ft to about 6 cycles/ft. In some embodiments, placing may involve puddling the crimped tow band with a puddling index of about 10 m/m to about 40 m/m. As used herein, the term "puddling" refers to allowing the tow band to lay at least partially on itself so as to place a greater actual length of tow band than linear distance on which it is placed. As used herein, the term "puddling index" refers to the length of tow band per linear distance on which it is placed.

In some embodiments of the present invention, baling may involve compressing the crimped tow band comprising tri-arc filaments of the present invention that has been placed in a suitable container. In some embodiments, baling may involve packaging the compressed crimped tow band comprising tri-arc filaments of the present invention. In some embodiments, the packaging may include at least one component like wrapping materials, vacuum ports (for releasing and/or pulling vacuum), securing elements, or any combination thereof. Suitable wrapping materials may include, but are not limited to, air-permeable materials, air-impermeable materials, films (e.g., polymeric films, polyethylene films, plastic wrap), heat-shrinkable films, cardboard, wood, woven materials (i.e., fabric composed of two sets of yarns interlaced with each other to form the fabric), non-woven materials (i.e., assemblies of textile fibers held together by mechanical or chemical means in a random web or mat, e.g., fused thermoplastic fibers), foil materials (e.g., metallic materials), and the like, or any combination thereof. Suitable securing elements may include, but are not limited to, VELCRO®, pins, hooks, straps (e.g., woven, non-woven, fabric, and/or metallic), adhesives, tapes, melt bondings, and the like, or any combination thereof. In some embodiments, at least a portion of the packaging (including any component thereof) may be reusable.

In some embodiments, bales comprising tri-arc filaments of the present invention may have dimensions ranging from about 30 inches (76 cm) to about 60 inches (152 cm) in height, about 46 inches (117 cm) to about 56 inches (142 cm) in length, and about 35 inches (89 cm) to about 45 inches (114 cm) in width. In some embodiments, bales may range in weight from 900 pounds (408 kg) to 2100 pounds (953 kg). In some embodiments, bales comprising tri-arc filaments of the present invention may have a density greater than about 300 kg/m$^3$ (18.8 lb/ft$^3$).

In some embodiments, tri-arc filaments of the present invention may comprise additives. Some embodiments of the present invention may involve applying additives to the tri-arc filaments of the present invention during any step outlined above or between any steps outlined above. Examples of suitable places to incorporate additives with tri-arc filaments of the present invention may include, but are not limited to, in the dope, in the finish, in the conditioning, or any combination thereof. Further, additives may be applied to the tri-arc filaments of the present invention at any point before forming the tow band, to the tri-arc filaments during and/or after forming the tow band, to the tri-arc filaments during and/or after crimping the tow band, to the tri-arc filaments during and/or after conditioning, or any combination thereof.

Suitable additives for use in conjunction with the present invention may include, but are not limited to, active particles, active compounds, ion exchange resins, zeolites, nanoparticles, ceramic particles, softening agents, plasticizers, pigments, dyes, flavorants, aromas, controlled release vesicles, microcapsules, binders, adhesives, tackifiers, surface modification agents, lubricating agents, emulsifiers, vitamins, peroxides, biocides, antifungals, antimicrobials, antistatic agents, flame retardants, antifoaming agents, degradation agents, conductivity modifying agents, stabilizing agents, or any combination thereof. In some embodiments, achieving tri-arc filaments that comprise an additive may be by including the additives in the dope; by applying the additives to the tri-arc filaments before, after, and/or during formation of a tow band; by applying the additives to the tri-arc filaments before, after, and/or during crimping the tow band; by applying the additives to the tri-arc filaments before, after, and/or during conditioning the crimped tow band; and any combination thereof. It should be noted that applying includes, but is not limited to, dipping, immersing, submerging, soaking, rinsing, washing, painting, coating, showering, drizzling, spraying, placing, dusting, sprinkling, affixing, and any combination thereof. Further, it should be noted that applying includes, but is not limited to, surface treatments, infusion treatments where the additive incorporates at least partially into the tri-arc filament, and any combination thereof.

One skilled in the art with the benefit of this disclosure should understand the concentration of the additive will depend at least on the composition of the additive, the size of the additive, the purpose of the additive, the point in the process in which the additive is included, and the size of the tri-arc filament. By way of nonlimiting example, additives may be present in the dope in an amount ranging from about 0.01% to about 10% by weight of the polymer. By way of another nonlimiting example, additives that comprise particulates may be included such that the tri-arc filament comprises about 0.01% to about 10% by volume of the tri-arc filament, as part of the tri-arc filaments and/or on the surface of the tri-arc filaments.

Suitable active particles for use in conjunction with the present invention may include, but are not limited to, nano-scaled carbon particles, carbon nanotubes having at least one wall, carbon nanohorns, bamboo-like carbon nanostructures, fullerenes, fullerene aggregates, graphene, few layer graphene, oxidized graphene, iron oxide nanoparticles, nanoparticles, metal nanoparticles, gold nanoparticles, silver nanoparticles, metal oxide nanoparticles, an alumina nanoparticle, a magnetic nanoparticle, paramagnetic nanoparticle, a superparamagnetic nanoparticle, a gadolinium oxide nanoparticle, a hematite nanoparticle, a magnetite nanoparticle, a gado-nanotube, an endofullerene, $Gd@C_{60}$, a core-shell nanoparticle, an onionated nanoparticle, a nanoshell, an onionated iron oxide nanoparticle, activated carbon, an ion exchange resin, a desiccant, a silicate, a molecular sieve, a silica gel, activated alumina, a zeolite, perlite, sepiolite, Fuller's Earth, magnesium silicate, a metal oxide, iron oxide, activated carbon, and any combination thereof.

Suitable active particles for use in conjunction with the present invention may have at least one dimension of about less than one nanometer, such as graphene, to as large as a particle having a diameter of about 5000 microns. In some embodiments, active particles may range from a lower size limit in at least one dimension of about: 0.1 nanometers, 0.5 nanometers, 1 nanometer, 10 nanometers, 100 nanometers, 500 nanometers, 1 micron, 5 microns, 10 microns, 50 microns, 100 microns, 150 microns, 200 microns, and 250 microns. In some embodiments, the active particles may range from an upper size limit in at least one dimension of about: 5000 microns, 2000 microns, 1000 microns, 900 microns, 700 microns, 500 microns, 400 microns, 300 microns, 250 microns, 200 microns, 150 microns, 100 microns, 50 microns, 10 microns, and 500 nanometers. Any combination of lower limits and upper limits above may be suitable for use in the present invention, wherein the selected maximum size is greater than the selected minimum size. In some embodiments, the active particles for use in conjunction with the present invention may be a mixture of particle sizes ranging from the above lower and upper limits. In some embodiments, the size of the active particles may be polymodal.

Suitable active compounds for use in conjunction with the present invention may include, but are not limited to, malic acid, potassium carbonate, citric acid, tartaric acid, lactic acid, ascorbic acid, polyethyleneimine, cyclodextrin, sodium hydroxide, sulphamic acid, sodium sulphamate, polyvinyl acetate, carboxylated acrylate, and any combination thereof.

Suitable ion exchange resins for use in conjunction with the present invention may include, but are not limited to, polymers with a backbone, such as styrene-divinyl benzene (DVB) copolymer, acrylates, methacrylates, phenol formaldehyde condensates, and epichlorohydrin amine condensates; a plurality of electrically charged functional groups attached to the polymer backbone; and any combination thereof.

Suitable zeolites for use in conjunction with the present invention may include crystalline aluminosilicates having pores, e.g., channels, or cavities of uniform, molecular-sized dimensions. Suitable zeolites for use in conjunction with the present invention may include natural and synthetic materials. Suitable zeolites may include, but are not limited to, zeolite BETA ($Na_7(Al_7Si_{57}O_{128})$ tetragonal), zeolite ZSM-5 ($Na_n(Al_nSi_{96-n}O_{192})$ $16H_2O$, with n<27), zeolite A, zeolite X, zeolite Y, zeolite K-G, zeolite ZK-5, zeolite ZK-4, mesoporous silicates, SBA-15, MCM-41, MCM48 modified by 3-aminopropylsilyl groups, alumino-phosphates, mesoporous aluminosilicates, other related porous materials (e.g., such as mixed oxide gels), or any combination thereof.

Suitable nanoparticles for use in conjunction with the present invention may include, but are not limited to, nano-scaled carbon particles like carbon nanotubes of any number of walls, carbon nanohorns, bamboo-like carbon nanostructures, fullerenes and fullerene aggregates, and graphene including few layer graphene and oxidized graphene; metal nanoparticles like gold and silver; metal oxide nanoparticles like alumina, silica, and titania; magnetic, paramagnetic, and superparamagnetic nanoparticles like gadolinium oxide, various crystal structures of iron oxide like hematite and magnetite, about 12 nm $Fe_3O_4$, gado-nanotubes, and endofullerenes like $Gd@C_{60}$; and core-shell and onionated nanoparticles like gold and silver nanoshells, onionated iron oxide, and other nanoparticles or microparticles with an outer shell of any of said materials; or any combination of the foregoing (including activated carbon). It should be noted that nanoparticles may include nanorods, nanospheres, nanorices, nanowires, nanostars (like nanotripods and nanotetrapods), hollow nanostructures, hybrid nanostructures that are two or more nanoparticles connected as one, and non-nano particles with nano-coatings or nano-thick walls. It should be further noted that nanoparticles for use in conjunction with the present invention may include the functionalized derivatives of nanoparticles including, but not limited to, nanoparticles that have been functionalized covalently and/or non-covalently, e.g., pi-stacking, physisorption, ionic association, van der Waals association, and the like. Suitable functional groups may include, but are not limited to, moieties comprising amines (1°, 2°, or 3°), amides, carboxylic acids, aldehydes, ketones, ethers, esters, peroxides, silyls, organosilanes, hydrocarbons, aromatic hydrocarbons, and any combination thereof; polymers; chelating agents like ethylenediamine tetraacetate, diethylenetriaminepentaacetic acid, triglycollamic acid, and a structure comprising a pyrrole ring; and any combination thereof. Functional groups may enhance removal of smoke components and/or enhance incorporation of nanoparticles into or onto the tri-arc filaments of the present invention.

Suitable softening agents and/or plasticizers for use in conjunction with the present invention may include, but are not limited to, water, glycerol triacetate (triacetin), triethyl citrate, dimethoxy-ethyl phthalate, dimethyl phthalate, diethyl phthalate, methyl phthalyl ethyl glycolate, o-phenyl phenyl-(bis) phenyl phosphate, 1,4-butanediol diacetate, diacetate, dipropionate ester of triethylene glycol, dibutyrate ester of triethylene glycol, dimethoxyethyl phthalate, triethyl citrate, triacetyl glycerin, and the like, any derivative thereof, and any combination thereof. One skilled in the art with the benefit of this disclosure should understand the concentration of plasticizers to use as an additive to the filaments. By way of non-limiting example, the plasticizer may be added to the dope in an amount sufficient to prevent rupture or bursting of the filament surface upon sudden thermal discharge of the adsorbed solvent.

As used herein, pigments refer to compounds and/or particles that impart color and are incorporated throughout the filaments. Suitable pigments for use in conjunction with the present invention may include, but are not limited to, titanium dioxide, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, calcium carbonate, kaolin clay, aluminum hydroxide, barium sulfate, zinc oxide, aluminum oxide, or any combination thereof.

As used herein, dyes refer to compounds and/or particles that impart color and are a surface treatment of the filaments. Suitable dyes may include, but are not limited to, CARTASOL® dyes (cationic dyes, available from Clariant Services) in liquid and/or granular form (e.g., CARTASOL® Brilliant Yellow K-6G liquid, CARTASOL® Yellow K-4GL liquid, CARTASOL® Yellow K-GL liquid, CARTASOL® Orange K-3GL liquid, CARTASOL® Scarlet K-2GL liquid, CARTASOL® Red K-3BN liquid, CARTASOL® Blue K-5R liquid, CARTASOL® Blue K-RL liquid, CARTASOL® Turquoise K-RL liquid/granules, CARTASOL® Brown K-BL liquid), FASTUSOL® dyes (an auxochrome, available from BASF) (e.g., Yellow 3GL, Fastusol C Blue 74L).

Suitable flavorants for use in conjunction with the present invention may be any flavorant suitable for use in smoking device filters including those that impart a taste and/or a flavor to the smoke stream. Suitable flavorants for use in conjunction with the present invention may include, but are not limited to, organic material (or naturally flavored particles), carriers for natural flavors, carriers for artificial flavors, and any combination thereof. Organic materials (or naturally flavored particles) include, but are not limited to, tobacco, cloves (e.g., ground cloves and clove flowers), cocoa, mint, peppermint, spearmint, vanilla, cinnamon, and the like. Natural and artificial flavors may include, but are not limited to, menthol, cloves, cherry, chocolate, orange, mint, mango, vanilla, cinnamon, tobacco, licorice, citrus, fruit flavors, banana, strawberry, grape, cherry, spice flavors, ginger, black tea, green tea, and the like. Such flavors may be provided by menthol, anethole (licorice), anisole, limonene (citrus), eugenol (clove), tea leaves, gamma octalactone, vanillin, ethyl vanillin, methyl salicylate, linalool, bergamot oil, geranium oil, lemon oil, ginger oil, phenylacetic acid, solanone, megastigmatrienone, 2-heptanone, benzylalcohol, cis-3-hexenyl acetate, valeric acid, valeric aldehyde, ester, terpene, sesquiterpene, nootkatone, maltol, damascenone, pyrazine, lactone, iso-valeric acid, and the like, or any combination thereof. In some embodiments, more than one flavorant may be used including any combination of the flavorants provided herein. These flavorants may be placed in the tobacco column or in a section of a filter. Additionally, in some embodiments, the tri-arc filaments of the present invention may comprise a flavorant. In some embodiments with smoking articles, the amount of flavorant to include will depend on the desired level of flavor in the smoke taking into account all filter sections, the length of the smoking device, the type of smoking device, the diameter of the smoking device, as well as other factors known to those of skill in the art.

Suitable aromas for use in conjunction with the present invention may include, but are not limited to, methyl formate, methyl acetate, methyl butyrate, ethyl acetate, ethyl butyrate, isoamyl acetate, pentyl butyrate, pentyl pentanoate, octyl acetate, myrcene, geraniol, nerol, citral, citronellal, citronellol, linalool, nerolidol, limonene, camphor, terpineol, alpha-ionone, thujone, benzaldehyde, eugenol, cinnamaldehyde, ethyl maltol, vanilla, anisole, anethole, estragole, thymol, furaneol, methanol, or any combination thereof. Further, a suitable aroma additive for use in conjunction with the present invention is a deodorant additive.

As used herein, "microcapsules" refer to porous microparticles (spherical or otherwise) having exterior surface pores and having diameters of less than about 1 micron to about 1000 microns. In some embodiments, microcapsules may comprise any of the additives described herein (singularly or in combination) provided the additives are suitably sized to fit within the inner contents and maintain operability of the microcapsule. Suitable microcapsules for use in conjunction with the present invention may be those formed by any suitable technique, which may include, but is not limited to, those described in U.S. Pat. No. 5,064,949 entitled "Cellulose Ester Microparticles and Processes for Making the Same," and U.S. Pat. No. 5,047,180 entitled "Process for Making Cellulose Ester Microparticles," the relevant disclosures of which are incorporated herein by reference. Suitable microcapsules for use in conjunction with the present invention may be formed of any suitable materials, which may include, but are not limited to, gelatins, celluloses, modified celluloses, methylcellulose, hydroxypropylmethyl cellulose, chlorophyllin, polyvinylalcohol, polyvinyl pyrrolidone, and the like, or any combination thereof.

Suitable binders for use in conjunction with the present invention may include, but are not limited to, polyolefins, polyesters, polyamides (or nylons), polyacrylics, polystyrenes, polyvinyls, polytetrafluoroethylene (PTFE), polyether ether ketone (PEEK), any copolymer thereof, any derivative thereof, and any combination thereof. Non-fibrous plasticized cellulose derivatives may also be suitable for use as binder particles in the present invention. Examples of suitable polyolefins may include, but are not limited to, polyethylene, polypropylene, polybutylene, polymethylpentene, and the like, any copolymer thereof, any derivative thereof, and any combination thereof. Examples of suitable polyethylenes may include, but are not limited to, ultrahigh molecular weight polyethylene, very high molecular weight polyethylene, high molecular weight polyethylene, low-density polyethylene, linear low-density polyethylene, high-density polyethylene, and the like, any copolymer thereof, any derivative thereof, and any combination thereof. Examples of suitable polyesters may include, but are not limited to, polyethylene terephthalate, polybutylene terephthalate, polycyclohexylene dimethylene terephthalate, polytrimethylene terephthalate, and the like, any copolymer thereof, any derivative thereof, and any combination thereof. Examples of suitable polyacrylics may include, but are not limited to, polymethyl methacrylate, and the like, any copolymer thereof, any derivative thereof, and any combination thereof. Examples of suitable polystyrenes may include, but are not limited to, polystyrene, acrylonitrile-butadiene-styrene, styrene-acrylonitrile, styrene-butadiene, styrene-maleic anhydride, and the like, any copolymer thereof, any derivative thereof, and any combination thereof. Examples of suitable polyvinyls may include, but are not limited to, ethylene vinyl acetate, ethylene vinyl alcohol, polyvinyl chloride, and the like, any copolymer thereof, any derivative thereof, and any combination thereof. Examples of suitable cellulosics may include, but are not limited to, cellulose acetate, cellulose acetate butyrate, plasticized cellulosics, cellulose propionate, ethyl cellulose, and the like, any copolymer thereof, any derivative thereof, and any combination thereof. In some embodiments, binder particles may comprise any copolymer, any derivative, or any combination of the above listed binders. Further, binder particles may be impregnated with and/or coated with any combination of additives disclosed herein.

Suitable tackifiers for use in conjunction with the present invention may include, but are not limited to, methylcellulose, ethylcellulose, hydroxyethylcellulose, carboxy methylcellulose, carboxy ethylcellulose, water-soluble cellulose acetate, amides, diamines, polyesters, polycarbonates, silyl-modified polyamide compounds, polycarbamates, urethanes, natural resins, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly(butyl acrylate), poly(2-ethylhexyl acrylate), acrylic acid ester co-polymers, methacrylic acid derivative polymers, methacrylic acid homopolymers, methacrylic acid ester homopolymers, poly (methyl methacrylate), poly(butyl methacrylate), poly(2-ethylhexyl methacrylate), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, benzyl coco di-(hydroxyethyl)quaternary amines, p-T-amyl-phenols condensed with formaldehyde, dialkyl amino alkyl(meth)acrylates, acrylamides, N-(dialkyl amino alkyl)acrylamide, methacrylamides, hydroxy alkyl(meth)acrylates, methacrylic acids, acrylic acids, hydroxyethyl acrylates, and the like, any derivative thereof, or any combination thereof.

Suitable lubricating agents for use in conjunction with the present invention may include, but are not limited to, ethoxylated fatty acids (e.g., the reaction product of ethylene oxide with pelargonic acid to form poly(ethylene glycol) ("PEG") monopelargonate; the reaction product of ethylene oxide with coconut fatty acids to form PEG monolaurate), and the like, or any combination thereof. The lubricant agents may also be selected from non-water soluble materials such as synthetic hydrocarbon oils, alkyl esters (e.g., tridecyl stearate which is the reaction product of tridecyl alcohol and stearic acid), polyol esters (e.g., trimethylol propane tripelargonate and pentaerythritol tetrapelargonate), and the like, or any combination thereof.

Suitable emulsifiers for use in conjunction with the present invention may include, but are not limited to, sorbitan monolaurate, e.g., SPAN® 20 (available from Uniqema, Wilmington, Del.) and poly(ethylene oxide) sorbitan monolaurate, e.g., TWEEN® 20 (available from Uniqema, Wilmington, Del.).

Suitable vitamins for use in conjunction with the present invention may include, but are not limited to, vitamin A, vitamin B1, vitamin B2, vitamin C, vitamin D, vitamin E, or any combination thereof.

Suitable antimicrobials for use in conjunction with the present invention may include, but are not limited to, antimicrobial metal ions, chlorhexidine, chlorhexidine salt, triclosan, polymoxin, tetracycline, amino glycoside (e.g., gentamicin), rifampicin, bacitracin, erythromycin, neomycin, chloramphenicol, miconazole, quinolone, penicillin, nonoxynol 9, fusidic acid, cephalosporin, mupirocin, metronidazolea secropin, protegrin, bacteriolcin, defensin, nitrofurazone, mafenide, acyclovir, vanocmycin, clindamycin, lincomycin, sulfonamide, norfloxacin, pefloxacin, nalidizic acid, oxalic acid, enoxacin acid, ciprofloxacin, polyhexamethylene biguanide (PHMB), PHMB derivatives (e.g., biodegradable biguanides like polyethylene hexaniethylene biguanide (PEHMB)), clilorhexidine gluconate, chlorohexidine hydrochloride, ethylenediaminetetraacetic acid (EDTA), EDTA derivatives (e.g., disodium EDTA or tetrasodium EDTA), and the like, and any combination thereof.

Suitable antistatic agents for use in conjunction with the present invention may comprise any suitable anionic, cationic, amphoteric or nonionic antistatic agent. Anionic antistatic agents may generally include, but are not limited to, alkali sulfates, alkali phosphates, phosphate esters of alcohols, phosphate esters of ethoxylated alcohols, or any combination thereof. Examples may include, but are not limited to, alkali neutralized phosphate ester (e.g., TRYFAC® 5559 or TRYFRAC® 5576, available from Henkel Corporation, Mauldin, S.C.). Cationic antistatic agents may generally include, but are not limited to, quaternary ammonium salts and imidazolines which possess a positive charge. Examples of nonionics include the poly(oxyalkylene) derivatives, e.g., ethoxylated fatty acids like EMEREST® 2650 (an ethoxylated fatty acid, available from Henkel Corporation, Mauldin, S.C.), ethoxylated fatty alcohols like TRYCOL® 5964 (an ethoxylated lauryl alcohol, available from Henkel Corporation, Mauldin, S.C.), ethoxylated fatty amines like TRYMEEN® 6606 (an ethoxylated tallow amine, available from Henkel Corporation, Mauldin, S.C.), alkanolamides like EMID® 6545 (an oleic diethanolamine, available from Henkel Corporation, Mauldin, S.C.), or any combination thereof. Anionic and cationic materials tend to be more effective antistats.

II. Filters, Smoking Devices, and Methods of Producing

In some embodiments of the present invention, a bale of crimped tow band comprising tri-arc filaments may be used to form filter rods, filters, filter sections, or any combination thereof that are suitable for use with smoking devices. For simplicity, the term "filter-like composition" will be used herein to describe filter rods, filters, and filter sections. Examples of suitable tow bands comprising tri-arc filaments may be those according to the various embodiments disclosed herein. In some embodiments, a bale of tow band (crimped or otherwise) comprising tri-arc filaments may be used in producing filter-like compositions. In some embodiments, a bale may comprise more than one tow band where at least one tow band comprises comprising tri-arc filaments.

In some embodiments of the present invention, filter-like compositions may include feeding a tow band (crimped or otherwise) comprising tri-arc filaments from a bale into an apparatus capable of producing filter-like compositions, or most preferably producing filter-like compositions. In some embodiments of the present invention, producing a filter rod comprising tri-arc filaments may include several steps including, but not limited to, at least one of the following: blooming the tow band comprising tri-arc filaments from the bale into a bloomed tow band comprising tri-arc filaments; optionally treating the bloomed tow band comprising tri-arc filaments with an additive; channeling the bloomed tow band comprising tri-arc filaments yielding a continuous tow cable comprising tri-arc filaments; wrapping a continuous tow cable comprising tri-arc filaments with a paper yielding a wrapped tow rod comprising tri-arc filaments; adhering the paper of a wrapped tow rod comprising tri-arc filaments yielding a filter rod length comprising tri-arc filaments; cutting the filter rod length comprising tri-arc filaments into filter-like compositions comprising tri-arc filaments; or any combination thereof. In some embodiments, producing filters and/or filter sections comprising tri-arc filaments may involve cutting filter rod lengths or filter rods comprising tri-arc filaments. In some embodiments, producing filter sections comprising tri-arc filaments may involve cutting filter rod lengths, filter rods, or filters comprising tri-arc filaments.

In some embodiments, wrapped tow rods, filter rod lengths, and/or filter-like compositions comprising tri-arc filaments may have a circumference ranging from a lower limit of about 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, or 26 mm to an upper limit of about 60 mm, 50 mm, 40 mm, 30 mm, 29 mm, 28 mm, 27 mm, 26 mm, 25 mm, 24 mm, 23 mm, 22 mm, 21 mm, 20 mm, 19 mm, 18 mm, 17 mm, or 16 mm, wherein the circumference may range from any lower limit to any upper limit and encompass any subset therebetween.

In some embodiments of the present invention, filter rod lengths and/or filter-like compositions comprising tri-arc filaments may have any cross-sectional shape including, but not limited to, circular, substantially circular, ovular, substantially ovular, polygonal (including those with rounded corners), or any hybrid thereof.

Some embodiments of the present invention for producing filter-like compositions comprising tri-arc filaments may involve treating the bloomed tow band comprising tri-arc filaments at least once with additives. In some embodiments, treating may occur while the bloomed tow band comprising tri-arc filaments has a large edge-to-edge width and/or while channeling the bloomed tow band comprising tri-arc filaments. It may be advantageous, but not required, that when the additive is in a particulate form, said treating occurs during channeling. It should be noted that treating may be done by any method including, but not limited to, applying, dipping, immersing, submerging, soaking, rinsing, washing, painting, coating, showering, drizzling, spraying, placing, dusting, sprinkling, affixing, or any combination thereof.

Suitable additives may be those delineated above including, but not limited to, active particles, active compounds, ion exchange resins, zeolites, nanoparticles, ceramic particles, softening agents, plasticizers, pigments, dyes, flavorants, aromas, controlled release vesicles, microcapsules, binders, adhesives, tackifiers, surface modification agents, lubricating agents, emulsifiers, vitamins, peroxides, biocides, antifungals, antimicrobials, antistatic agents, flame retardants, antifoaming agents, degradation agents, conductivity modifying agents, stabilizing agents, and any combination thereof.

In some embodiments of the present invention, additives, e.g., active particles and/or active compounds, may be capable of reducing and/or removing a smoke stream component from a smoke stream. One skilled in the art, with the benefit of this disclosure should understand that a smoke stream may be interchanged with a fluid stream for other filter applications. Examples of smoke stream components may include, but are not limited to, acetaldehyde, acetamide, acetone, acrolein, acrylamide, acrylonitrile, aflatoxin B-1, 4-aminobiphenyl, 1-aminonaphthalene, 2-aminonaphthalene, ammonia, ammonium salts, anabasine, anatabine, 0-anisidine, arsenic, A-a-C, benz[a]anthracene, benz[b]fluoroanthene, benz[j]aceanthrylene, benz[k]fluoroanthene, benzene, benzo(b)furan, benzo[a]pyrene, benzo[c]phenanthrene, beryllium, 1,3-butadiene, butyraldehyde, cadmium, caffeic acid, carbon monoxide, catechol, chlorinated dioxins/furans, chromium, chrysene, cobalt, coumarin, a cresol, crotonaldehyde, cyclopenta[c,d]pyrene, dibenz(a,h)acridine, dibenz(a,j)acridine, dibenz[a,h]anthracene, dibenzo(c,g)carbazole, dibenzo[a,e]pyrene, dibenzo[a,h]pyrene, dibenzo[a,i]pyrene, dibenzo[a,l]pyrene, 2,6-dimethylaniline, ethyl carbamate (urethane), ethylbenzene, ethylene oxide, eugenol, formaldehyde, furan, glu-P-1, glu-P-2, hydrazine, hydrogen cyanide, hydroquinone, indeno[1,2,3-cd]pyrene, IQ, isoprene, lead, MeA-α-C, mercury, methyl ethyl ketone, 5-methylchrysene, 4-(methylnitrosamino)-1-(3-pyridyl)-1-butanone (NNK), 4-(methylnitrosamino)-1-(3-pyridyl)-1-butanol (NNAL), naphthalene, nickel, nicotine, nitrate, nitric oxide, a nitrogen oxide, nitrite, nitrobenzene, nitromethane, 2-nitropropane, N-nitrosoanabasine (NAB), N-nitrosodiethanolamine (NDELA), N-nitrosodiethylamine, N-nitrosodimethylamine (NDMA), N-nitrosoethylmethylamine, N-nitrosomorpholine (NMOR), N-nitrosonornicotine (NNN), N-nitrosopiperidine (NPIP), N-nitrosopyrrolidine (NPYR), N-nitrososarcosine (NSAR), phenol, PhIP, polonium-210 (radio-isotope), propionaldehyde, propylene oxide, pyridine, quinoline, resorcinol, selenium, styrene, tar, 2-toluidine, toluene, Trp-P-1, Trp-P-2, uranium-235 (radio-isotope), uranium-238 (radio-isotope), vinyl acetate, vinyl chloride, or any combination thereof. In some embodiments of the present invention, additives may be capable of reducing and/or removing a component from a fluid stream. Suitable components may include, but are not limited to, dust particulates, pollen, mold, bacteria, ozone, and the like, or any combination thereof.

Suitable papers for use in conjunction with the present invention may include, but are not limited to, tipping papers, plug wrap papers, tipping base papers, wood-based papers, paper containing flaxs, flax papers, functionalized papers, special marking papers, colorized papers, high porosity papers, corrugated papers, high surface strength papers, or any combination thereof. One skilled in the art, with the benefit of this disclosure, should recognize that the paper may be substituted with any known sheet material. In some embodiments, papers for use in conjunction with the present invention may comprise additives, sizings, printability agents, or any combination thereof.

Some embodiments of the present invention may involve adhering the paper of a wrapped tow rod comprising tri-arc filaments yielding a filter rod length comprising tri-arc filaments. Adhering may be achieved with any known adhesive capable of adhesively securing the paper wrapped about the tow rod.

Some embodiments of the present invention may involve cutting the filter rod length comprising tri-arc filaments into filter-like compositions comprising tri-arc filaments. Cutting may involve any known method and/or apparatus of cutting. The length of a filter rod comprising tri-arc filaments may range from a lower limit of about 50 mm, 75 mm, or 100 mm to an upper limit of about 150 mm, 140 mm, 130 mm, 120 mm, 110 mm, or 100 mm, and wherein the length may range from any lower limit to any upper limit and encompass any subset therebetween. The length of a filter comprising tri-arc filaments may range from a lower limit of about 20 mm, 25 mm, or 30 mm to an upper limit of about 50 mm, 45 mm, or 40 mm, and wherein the length may range from any lower limit to any upper limit and encompass any subset therebetween. The length of a filter section comprising tri-arc filaments may range from a lower limit of about 3 mm, 4 mm, or 5 mm to an upper limit of about 20 mm, 15 mm, 14 mm, 13 mm, 12 mm, 11 mm, or 10 mm, and wherein the length may range from any lower limit to any upper limit and encompass any subset therebetween.

In some embodiments of the present invention, filter-like compositions comprising tri-arc filaments may be characterized by the draw characteristic. One measure of draw characteristics is the encapsulated pressure drop. As used herein, the term "encapsulated pressure drop" or "EPD" refers to the static pressure difference between the two ends of a specimen when it is traversed by an air flow under steady conditions when the volume flow is 17.5 ml/sec at the output end when the specimen is completely encapsulated in a measuring device so that no air can pass through the wrapping. EPD has been measured herein under the CORESTA ("Cooperation Centre for Scientific Research Relative to Tobacco") Recommended Method No. 41, dated June 2007. Higher EPD values translate to the smoker having to draw on a smoking device with greater force.

Some embodiments of the present invention may involve connecting at least two filter sections with at least one filter section comprising tri-arc filaments. Some embodiments may involve connecting at least two filter sections comprising tri-arc filaments in fluid communication with each other. Connecting may include, but is not limited to, joining, attaching, combining, associating, coupling, or the like. In some embodiments, connecting may be end-to-end along the longitudinal axis of the filter sections with at least one filter section comprising tri-arc filaments. In some embodiments, connecting at least two filter sections, at least one of which comprises tri-arc filaments, may form a sectioned filter and/or a sectioned filter rod comprising tri-arc filaments. Some embodiments may involve providing at least two filter sections, at least one of which comprises tri-arc filaments, in respective containers, e.g., hoppers, crates, boxes, drums, bags, or cartons, before connecting. Some embodiments may comprise feeding the at least two filter sections into a row wherein the sections are alternated. Some embodiments may involve wrapping the at least two filter sections, at least one of which comprises tri-arc filaments, with a paper to form a segmented filter and/or a segmented filter rod comprising tri-arc filaments. Some embodiments may involve transporting the segmented filter and/or the segmented filter rod comprising tri-arc filaments for storage or use.

In some embodiments, a filter comprising tri-arc filaments may be a sectioned filter comprising tri-arc filaments. In some embodiments, sectioned filters comprising tri-arc filaments may comprise at least one first section that comprises tri-arc filaments and at least one second filter section different from the first section that may or may not comprise tri-arc filaments. Suitable second filter sections for use in conjunction with the present invention may include, but are not limited to, cavities, porous masses, polypropylene, polyethylene, polyolefin tow, polypropylene tow, polyethylene terephthalate, polybutylene terephthalate, random oriented acetate, papers, corrugated papers, concentric filters, carbon-on-tow, silica, magnesium silicate, zeolites, molecular sieves, salts, catalysts, sodium chloride, nylon, flavorants, tobacco, capsules, cellulose, cellulosic derivatives, cellulose acetate, catalytic converters, iodine pentoxide, coarse powders, carbon particles, carbon fibers, fibers, glass beads, nanoparticles, void chambers, baffled void chambers, or any combination thereof. It should be noted that first and second are used for clarity in the description and do not imply any order or positional relationship. In some embodiments, the first filter section and the second filter section may be different filter sections described herein, e.g., different additives, different additive concentrations, different EPD, different total denier, different dpf, or any combination thereof. In some embodiments, the first and second filter sections may comprise substantially the same components (e.g., tri-arc cellulose acetate filaments, activated carbon additives, and menthol flavorants in microcapsules) but have different EPD values.

In some embodiments of the present invention, filter-like compositions (sectioned or otherwise) comprising tri-arc filaments may comprise at least one cavity. In some embodiments, a cavity may be between two filter sections. The cavity may be filled with a variety of substances including, but not limited to, additives (including any described herein that are appropriately sized), granulated carbon, flavorants, catalysts, molecular sieves, zeolites, or any combination thereof. The cavity may contain a capsule, e.g., a polymeric capsule, that itself contains a flavorant or catalyst. In some embodiments, said capsule may completely or partially fill the cavity. The cavity, in some embodiments, may also contain a molecular sieve that reacts with selected components in the smoke to remove or reduce the concentration of the components without adversely affecting desirable flavor constituents of the smoke. In some embodiments, the cavity may include tobacco as an additional flavorant. In some embodiments, a sectioned filter comprising tri-arc filaments of the present invention may comprise first and second filter sections that are substantially the same or the same where between the sections a cavity resides, where the cavity may or may not hold a capsule. It should be noted that a cavity insufficiently filled with a chosen substance may lack sufficient interaction between the components of the mainstream smoke and the substance in the cavity.

In some embodiments of the present invention, filter-like compositions (sectioned or otherwise) comprising tri-arc filaments may have a circumference less than about 17 mm and an encapsulated pressure drop (EPD) of about 4.5 mm water/mm length or less, about 3.5 mm water/mm length or less, about 2.5 mm water/mm length or less, or about 2 mm water/mm length or less.

In some embodiments of the present invention, filter-like compositions (sectioned or otherwise) comprising tri-arc filaments may have a circumference less than about 26 mm and an encapsulated pressure drop (EPD) of about 4.5 mm water/mm length or less, about 3.5 mm water/mm length or less, about 2.5 mm water/mm length or less, or about 2 mm water/mm length or less.

Because of the tri-arc cross-section of filaments of the present invention, the tri-arc filaments may be able to accommodate more additives in filter-like compositions and maintain encapsulated pressure drops desirable to smokers. In some embodiments of the present invention, filter-like compositions (sectioned or otherwise) comprising tri-arc filaments may have a circumference of about 17 mm or less and an effective amount of an additive to achieve an EPD of about 3.5 to about 20 mm water/mm length or less, wherein without the additive the filter-like composition may have an EPD of about 3 mm water/mm length or less. In some embodiments, filter-like compositions (sectioned or otherwise) comprising tri-arc filaments may have a circumference of about 17 mm or less and an effective amount of an additive to achieve an EPD of about 2.5 to about 20 mm water/mm length or less, wherein without the additive the filter-like composition may have an EPD of about 2 mm water/mm length or less.

In some embodiments of the present invention, filter-like compositions (sectioned or otherwise) comprising tri-arc filaments may have a circumference of about 26 mm or less and an effective amount of an additive to achieve an EPD of about 3.5 to about 20 mm water/mm length or less, wherein without the additive the filter-like composition may have an EPD of about 3 mm water/mm length or less. In some embodiments, filter-like compositions (sectioned or otherwise) comprising tri-arc filaments may have a circumference of about 26 mm or less and an effective amount of an additive to achieve an EPD of about 2.5 to about 20 mm water/mm length or less, wherein without the additive the filter-like composition may have an EPD of about 2 mm water/mm length or less.

Some embodiments of the present invention may involve operably connecting filter-like compositions (sectioned or otherwise) comprising tri-arc filaments to a smokeable substance. Some embodiments may involve connecting filter-like compositions (sectioned or otherwise) comprising tri-arc filaments to a smokeable substance such that filter-like compositions are in fluid communication with the smokeable substance.

In some embodiments of the present invention, filter-like compositions (sectioned or otherwise) comprising tri-arc filaments to a smokeable substance may be in fluid communication with a smokeable substance. In some embodiments, a smoking device may comprise a filter-like composition (sectioned or otherwise) comprising tri-arc filaments to a smokeable substance in fluid communication with a smokeable substance. In some embodiments of the present invention, a smoking device may comprise a housing operably capable of maintaining a filter-like composition (sectioned or otherwise) comprising tri-arc filaments in fluid communication with a smokeable substance. In some embodiments, a filter-like composition (sectioned or otherwise) comprising tri-arc filaments may be removable, replaceable, and/or disposable from the housing.

As used herein, the term "smokeable substance" refers to a material capable of producing smoke when burned or heated. Suitable smokeable substances may include, but are not limited to, tobaccos (e.g., bright leaf tobacco, Oriental tobacco, Turkish tobacco, Cavendish tobacco, corojo tobacco, criollo tobacco, Perique tobacco, shade tobacco, white burley tobacco, flue-cured tobacco, Burley tobacco, Maryland tobacco, Virginia tobacco), teas, herbs, carbonized or pyrolyzed components, inorganic filler components, or any combination thereof. Tobacco may have the form of tobacco laminae in cut filler form, processed tobacco stems, reconstituted tobacco filler, volume expanded tobacco filler, and the like. Tobacco, and other grown smokeable substances, may be grown in the United States, or may be grown in a jurisdiction outside the United States.

In some embodiments, a smokeable substance may be in a column format, e.g., a tobacco column. As used herein, the term "tobacco column" refers to the blend of tobacco, and optionally other ingredients and flavorants that may be combined to produce a tobacco-based smokeable article, such as a cigarette or cigar. In some embodiments, the tobacco column may comprise ingredients selected from the group consisting of: tobacco, sugar (such as sucrose, brown sugar, invert sugar, or high fructose corn syrup), propylene glycol, glycerol, cocoa, cocoa products, carob bean gums, carob bean extracts, and any combination thereof. In still other embodiments, the tobacco column may further comprise flavorants, aromas, menthol, licorice extract, diammonium phosphate, ammonium hydroxide, and any combination thereof. In some embodiments, tobacco columns may comprise additives, including those described herein. In some embodiments, tobacco columns may comprise at least one bendable element.

Suitable housings for use in conjunction with the present invention may include, but are not limited to, cigarette, cigarette holder, cigars, cigar holders, pipes, water pipes, hookahs, electronic smoking devices, roll-your-own cigarettes, roll-your-own cigars, papers, or any combination thereof.

In some embodiments of the present invention, filter-like compositions (sectioned or otherwise) comprising tri-arc filaments may be degradable over time either naturally or in the presence of a catalyst. As used herein, the term "degradable" refers to the ability to decompose when exposed to an outdoor environment (i.e., exposed to rain, dew, or other sources of water). The degree of degradation is, at a minimum, sufficient to convert the cellulose acetate into cellulose and, at a maximum, sufficient to convert the cellulose acetate into glucose. In some embodiments, degradation may occur over at least 1 month, about 6 months or less, about 2 years or less, or about 5 years or less. One skilled in the art with the benefit of this disclosure should understand that the environmental condition, e.g., exposure to light and relative humidity, and the additives, e.g., catalysts, of the filter-like compositions will affect the rate of degradation.

In some embodiments of the present invention, the filter-like compositions (sectioned or otherwise) comprising tri-arc filaments may be recyclable.

In some embodiments of the present invention, a pack of filters may comprise filter-like compositions (sectioned or otherwise) comprising tri-arc filaments according to any embodiment described herein. Packs may be a hinge-lid pack, a slide-and-shell pack, a hard cup pack, a soft cup pack, or any other suitable pack container. In some embodiments, packs may have an outer wrapping, such as a polypropylene wrapper, and optionally a tear tab. In some embodiments, the filter-like compositions (sectioned or otherwise) comprising tri-arc filaments may be sealed as a bundle inside a pack. A bundle may contain any number of filter-like compositions (sectioned or otherwise) comprising tri-arc filaments, e.g., 10 or more. However, a bundle may include a single filter-like composition (sectioned or otherwise) comprising tri-arc filaments, such as those for individual sale, or those comprising a specific spice, like vanilla, clove, or cinnamon.

In some embodiments, a pack of smoking devices may comprise at least one smoking device having a filter-like composition (sectioned or otherwise) comprising tri-arc filaments according to any embodiment described herein. Packs may be a hinge-lid pack, a slide-and-shell pack, a hard cup pack, a soft cup pack, or any other suitable pack container. In some embodiments of the present invention, the smoking devices may be sealed as a bundle inside a pack. A bundle may contain a number of smoking devices, e.g., 10 or more. However, a bundle may include a single smoking device, in some embodiments, such as a cigar, or a smoking device comprising a specific spice, like vanilla, clove, or cinnamon.

In some embodiments, the present invention provides a carton of smoking device packs that includes at least one pack of smoking devices that includes at least one smoking device having a filter-like composition (sectioned or otherwise) comprising tri-arc filaments according to any embodiment described herein. In some embodiments, the carton (e.g., a container) has the physical integrity to contain the weight from the packs of cigarettes.

Because it is expected that a consumer will smoke a smoking device that includes a filter-like composition (sectioned or otherwise) comprising tri-arc filaments according to any embodiment described herein, the present invention also provides methods of smoking such a smoking device. For example, in one embodiment, the present invention provides a method of smoking a smoking device comprising: heating or lighting a smoking device to form smoke, the smoking device comprising a filter-like composition (sectioned or otherwise) comprising tri-arc filaments according to any embodiment described herein; and drawing the smoke through the smoking device, wherein the filter-like composition reduces the presence of at least one component in the smoke stream. In some embodiments, the smoking device is a cigarette. In other embodiments, the smoking device is a cigar, a pipe, a water pipe, a hookah, an electronic smoking device, a smokeless smoking device, a roll-your-own cigarette, a roll-your-own cigar, or another smoking device.

To facilitate a better understanding of the present invention, the following representative examples of preferred embodiments are given. In no way should the following examples be read to limit, or to define, the scope of the invention.

EXAMPLES

Example 1

Two spinnerets with tri-arc holes were produced by hand with a die punch having a tri-arc hole shape, where Spinneret A has a radius (R) of 40 microns, and Spinneret B has tri-arc holes with a radius (R) of 40 microns.

Tri-arc filaments were spun from a dope comprising cellulose acetate and acetone at a speed of 365 m/min, a dope temperature of 72° C., an air temperature of 80° C., and an elongation of about 28-30%. The total denier of the produced tri-arc filaments ranged from about 5.7 dpf to about 6.9 dpf. Y-shaped cellulose acetate filaments with a similar dpf were used as a control.

Figure 8A:
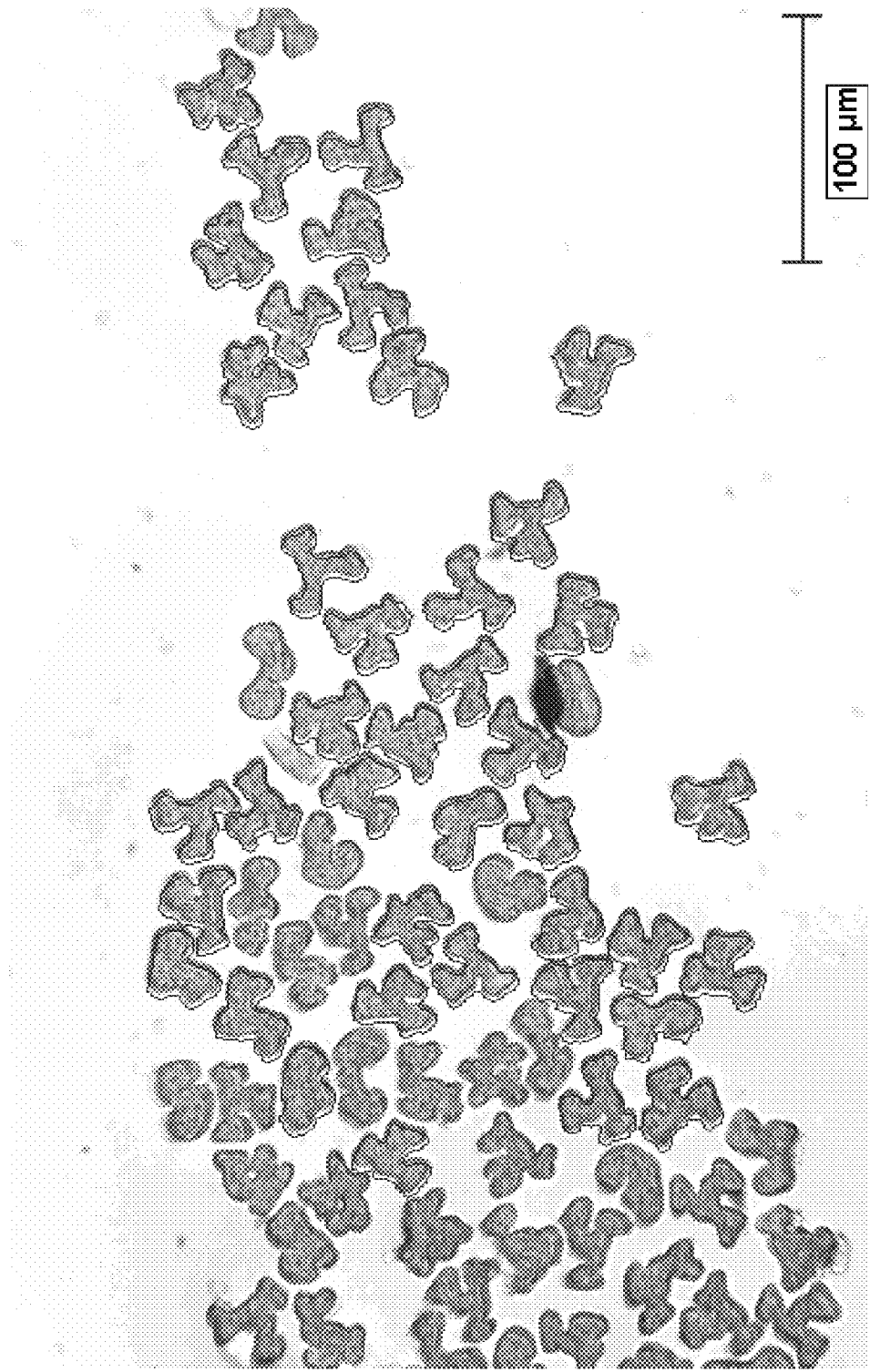
FIGS. 8A-B provide optical micrographs of tri-arc filaments according to some embodiments of the present invention.
Figure 8B:
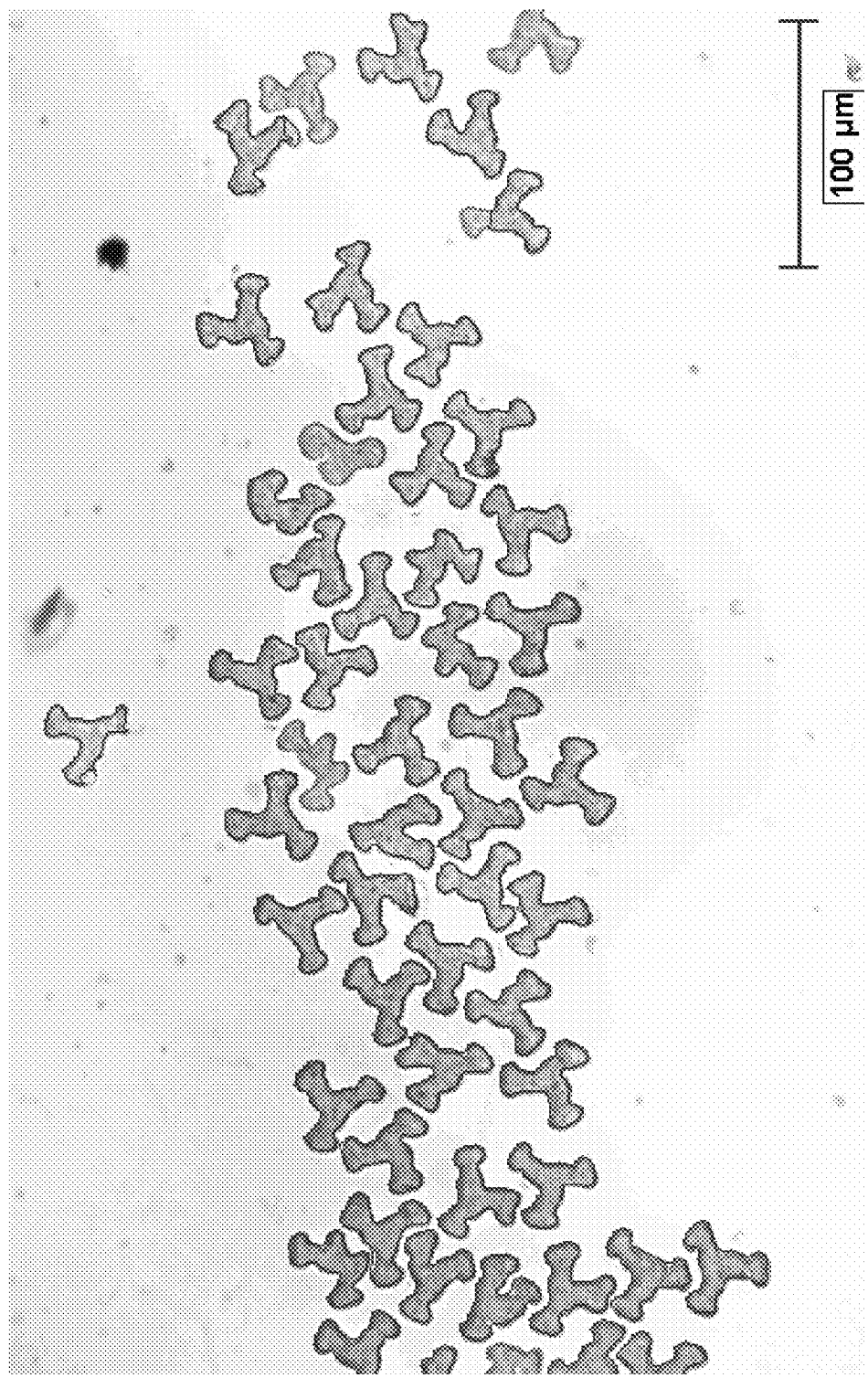

FIGS. 8A-B provide optical micrographs of the cross-sections of the tri-arc A filaments and the tri-arc B filaments. FIG. 8A shows three-tip filaments having large bulbous tips that often touch. FIG. 8B shows three-tip filaments having large bulbous tips that rarely touch and have a higher void volume between tips than tri-arc A filaments.

The filaments of the various samples (tri-arc A filaments, tri-arc B filaments, and Y-shaped filaments) were used to produce individual knit samples and tested for water retention characteristics. First, the knit samples were weighed, submerged in deionized water for 30 seconds, allowed to drip-dry for 60 seconds, and re-weighed. Water retention as reported by wet weight divided by dry weight was then calculated. The Y-shaped filaments had a water retention of about 3.4, the tri-arc A filaments of about 3.7 (about 9% greater than the Y-shaped filaments), and the tri-arc B filaments of about 4.5 (about 32% greater than the Y-shaped filaments). Without being limited by theory, it is believed that the higher void space between the tips of the filaments, the bulbous tip ends that may hinder water escape, and the higher surface area of the tri-arc B filaments provided for, at least in part, the higher water retention characteristics.

Example 2

Tri-arc filaments having about 16-18 denier per filament were prepared with two spinnerets having different tri-arc holes having a radius (R) of about 60-70 microns. Spinneret C with tri-arc C holes had an inter-arc angle ($\alpha$) of about 60°, and spinneret D with tri-arc D holes having an inter-arc angle ($\alpha$) of about 120°. For both, a dope comprising acetone and cellulose acetate was spun using the respective spinneret, a draw-down speed of about 350 m/min, a dope temperature of 72° C., an air temperature of 85° C., and an elongation of about 29-37%.

Figure 9A:
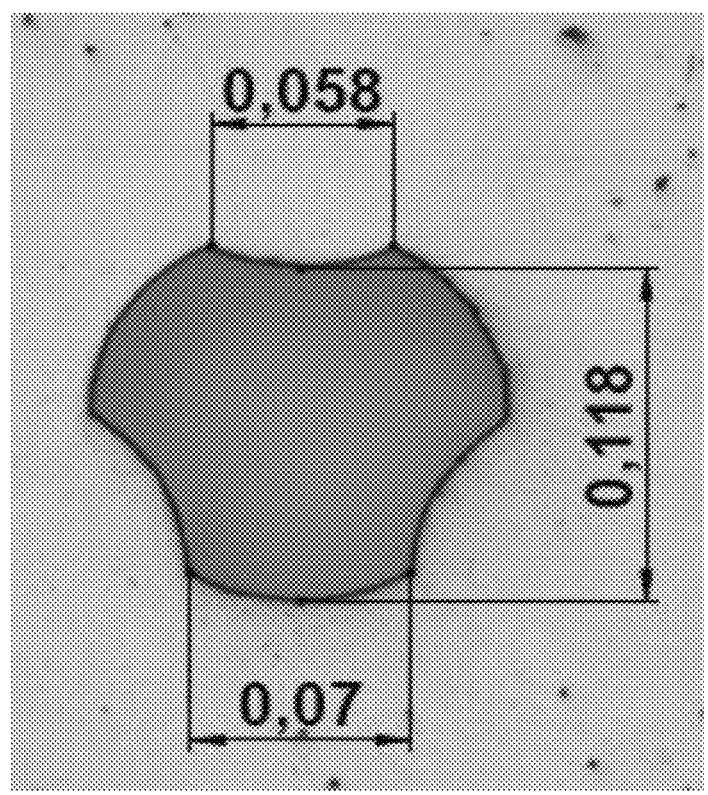
FIGS. 9A-B provide optical micrographs of a tri-arc hole and tri-arc filaments, respectfully, according to some embodiments of the present invention.
Figure 9B:
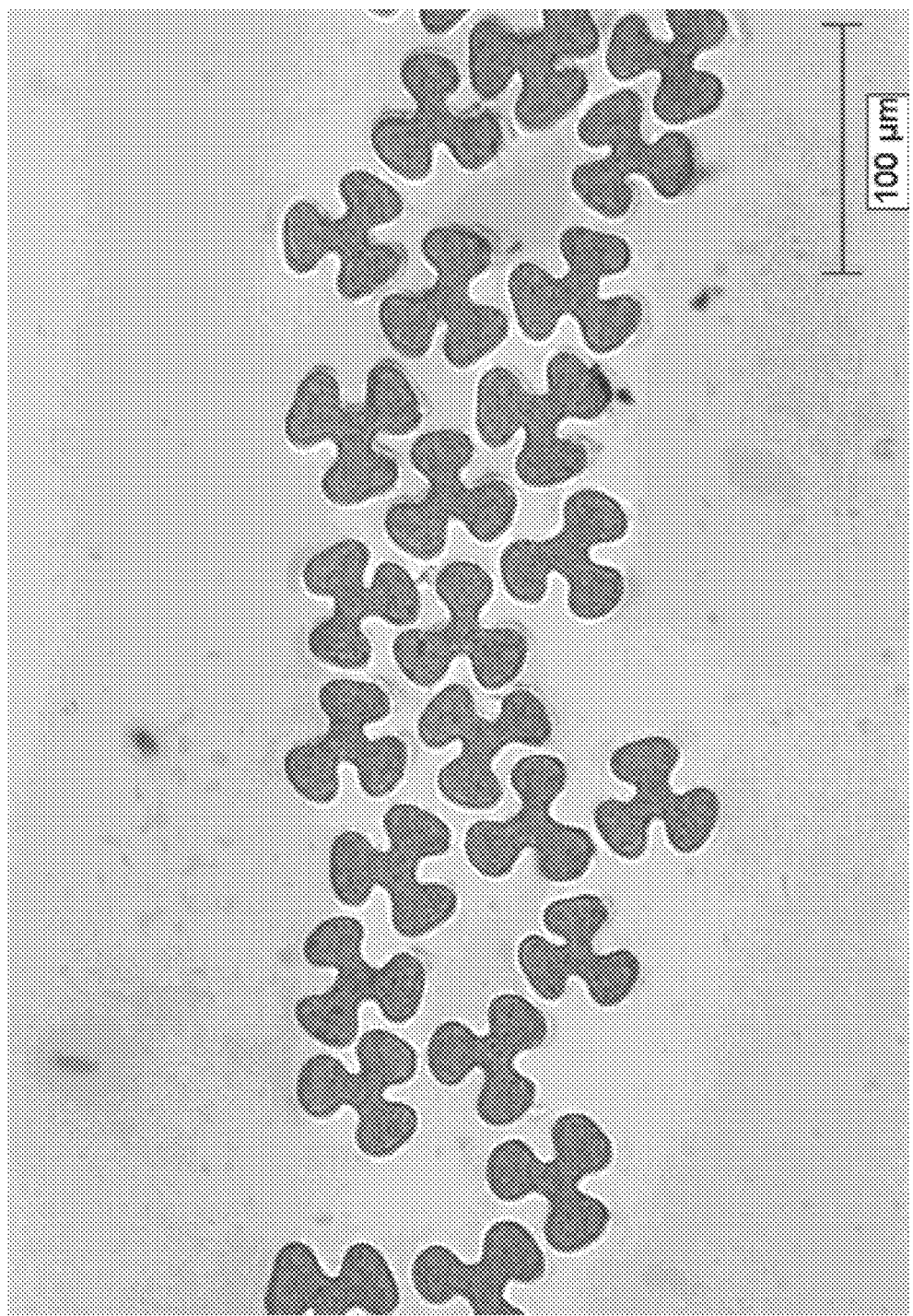

FIGS. 9A-B provide optical micrographs of the tri-arc C holes and tri-arc C filaments, respectively. Specifically, FIG. 9A shows a tri-arc C hole with an arc distance (C) of about 0.07 mm and an inter-arc distance (L) of about 0.058 mm. FIG. 9B shows cross-sections of the produced tri-arc C filaments having three large bulbous tips.

Figure 10A:
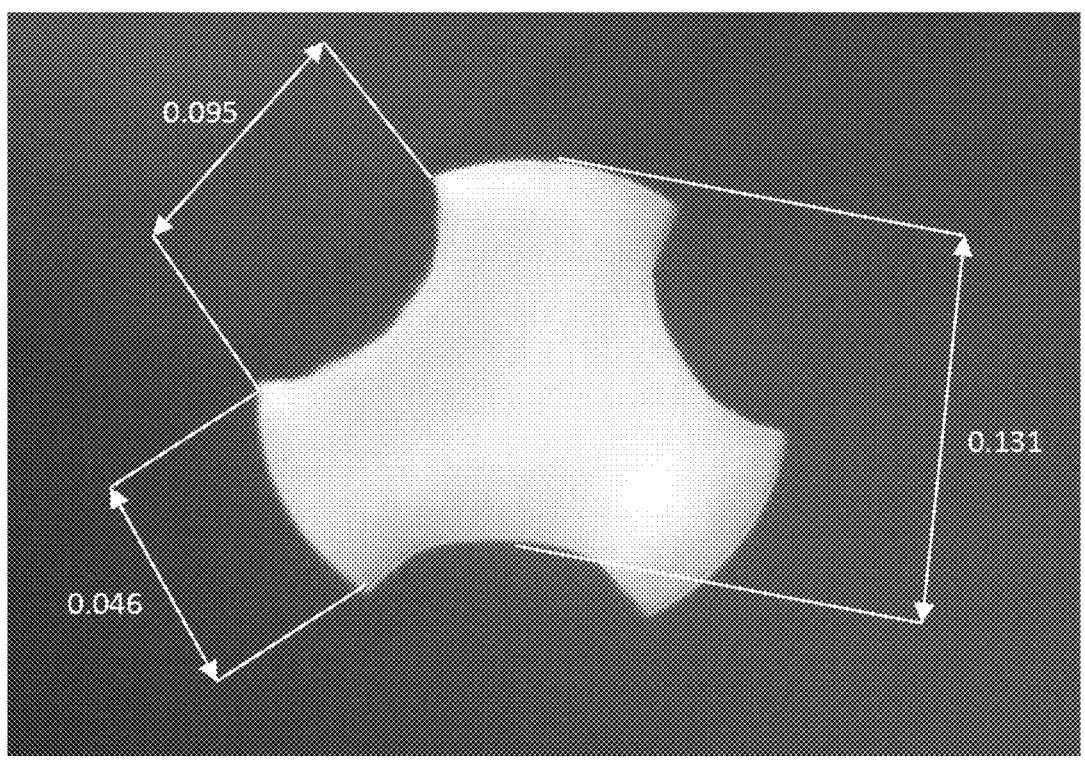
FIGS. 10A-B provide optical micrographs of a tri-arc hole and tri-arc filaments, respectfully, according to some embodiments of the present invention.
Figure 10B:
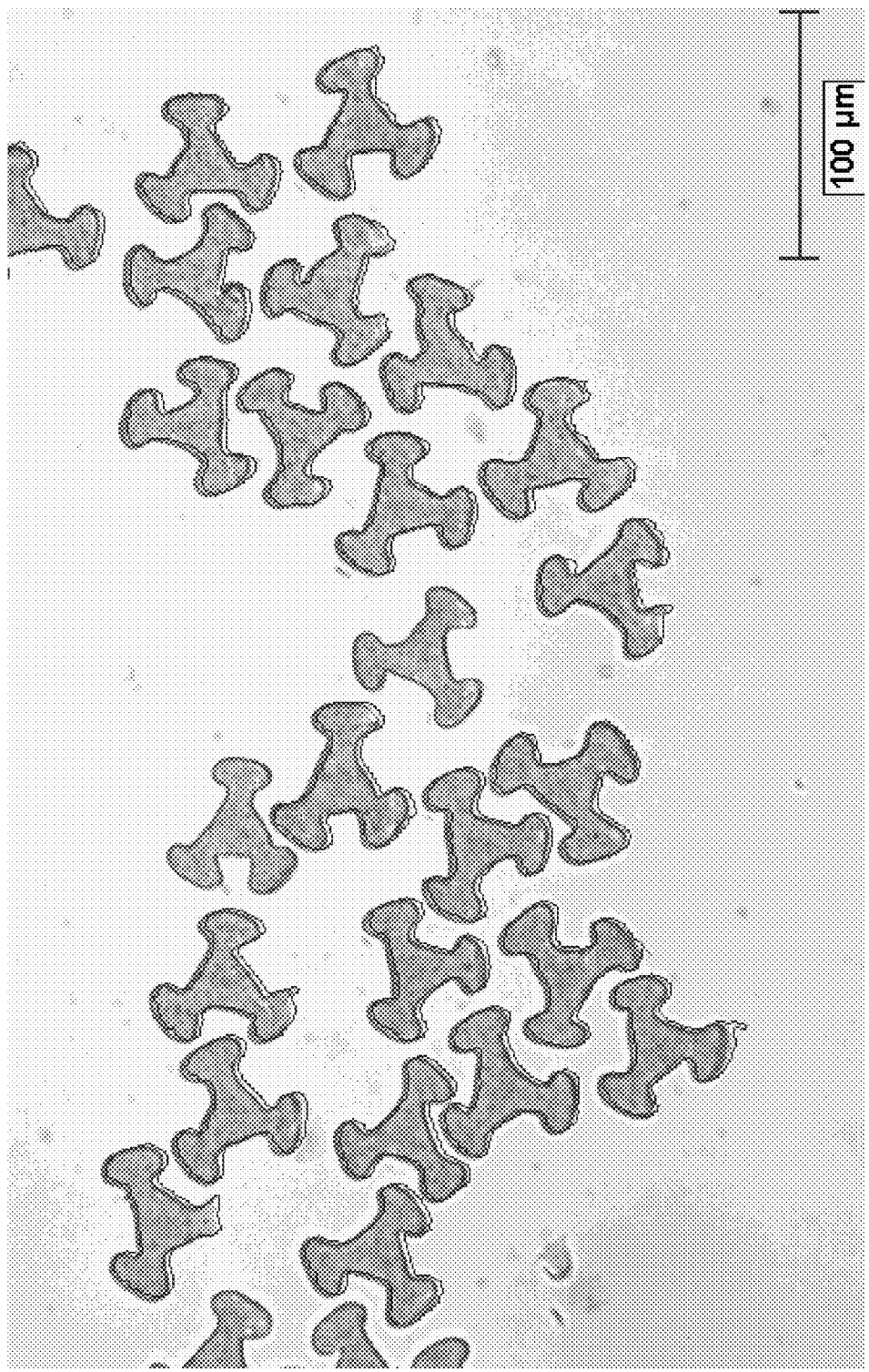

FIGS. 10A-B provide optical micrographs of the tri-arc D holes and tri-arc D filaments, respectively. Specifically, FIG. 10A shows a tri-arc D hole with an arc distance (C) of about 0.046 mm and an inter-arc distance (L) of about 0.095 mm. FIG. 10B shows cross-sections of the produced tri-arc D filaments having three bulbous tips that as compared to tri-arc C filaments are slightly smaller and have some arcing characteristic.

Example 3

Tri-arc filaments having about 6-8 denier per filament were prepared with two spinnerets having different tri-arc holes having a radius (R) of about 25-40 microns. Spinneret E with tri-arc E holes had an inter-arc angle ($\alpha$) of about 60°, and spinneret F with tri-arc F holes having an inter-arc angle ($\alpha$) of about 120°. For both, a dope comprising acetone and cellulose acetate was spun using the respective spinneret, a draw-down speed of about 365 m/min, a dope temperature of 72° C., an air temperature of 80° C., and an elongation of about 28-44%.

Figure 11:
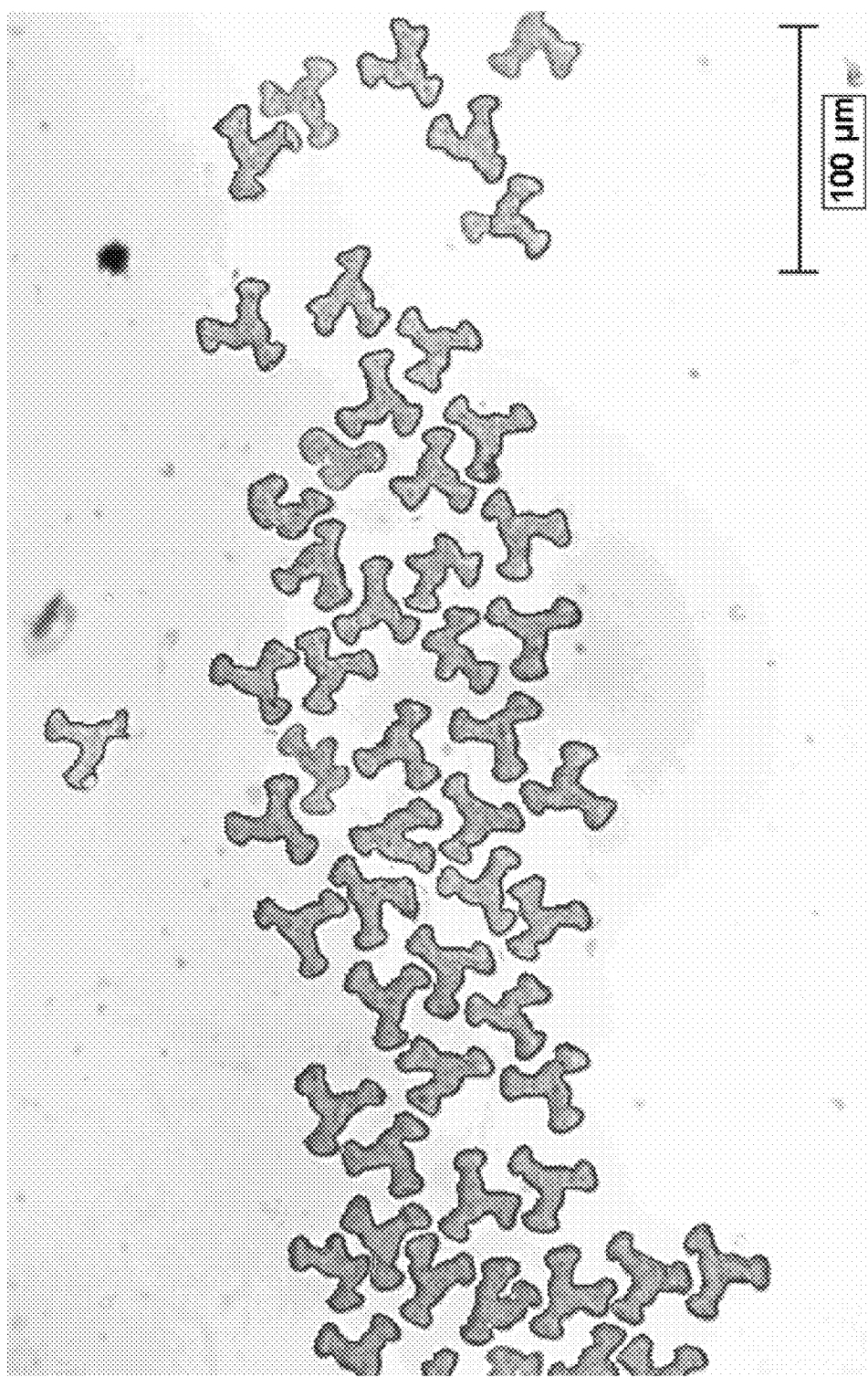
FIGS. 11-14 provide optical micrographs of tri-arc filaments according to some embodiments of the present invention.
Figure 12:
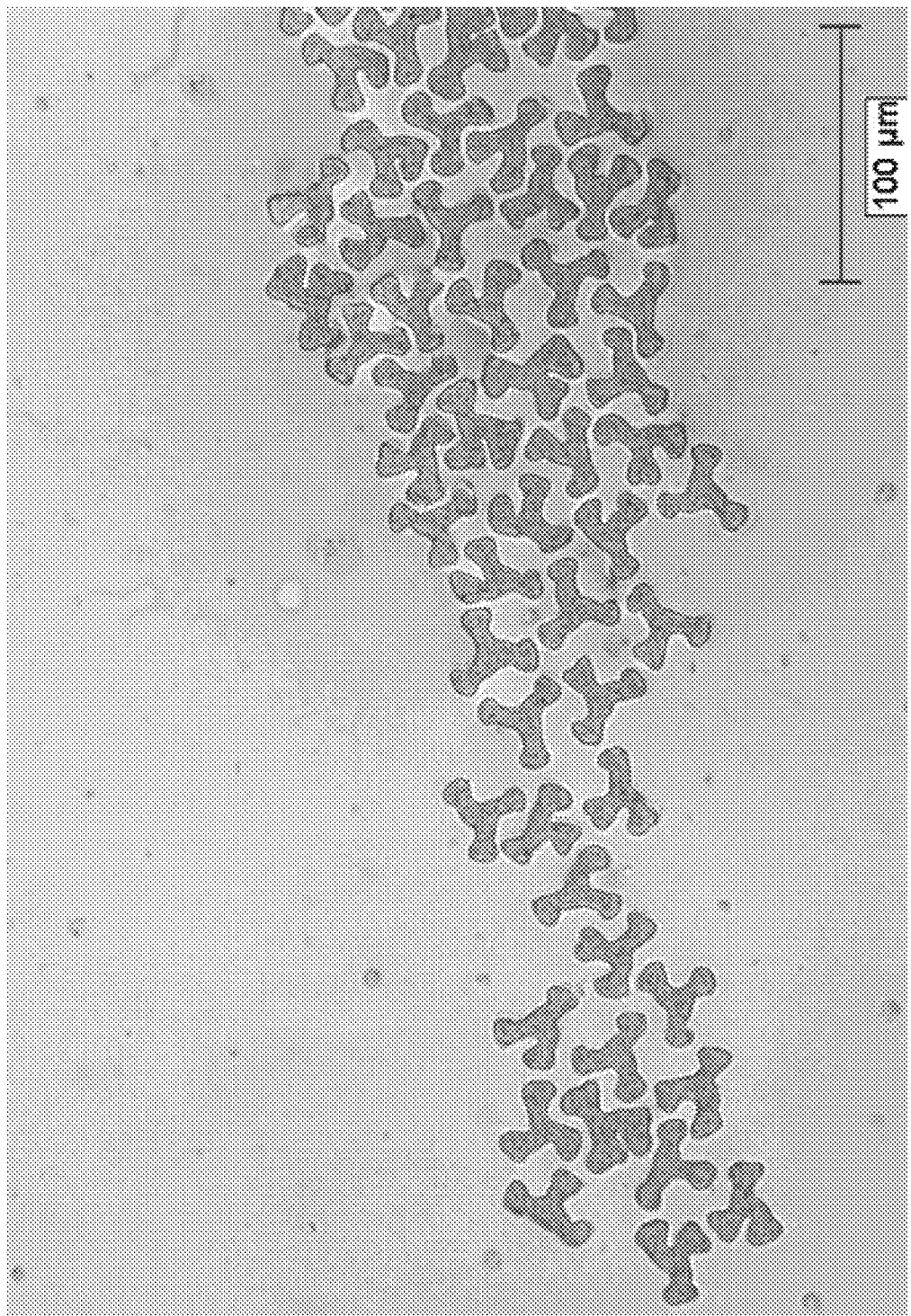

FIGS. 11-12 provide optical micrographs of the tri-arc E filaments and tri-arc F filaments, respectively. Specifically, FIG. 11 shows cross-sections of the produced tri-arc E filaments having three large bulbous tips. FIG. 12 shows cross-sections of the produced tri-arc F filaments having three bulbous tips that are slightly smaller than the tri-arc E filaments and have some arcing characteristic.

Example 4

Tri-arc filaments having about 18-22 denier per filament were prepared with spinnerets C and D from Example 2. Spinneret C was used to produce tri-arc filaments G, and spinneret D was used to produce tri-arc filaments H. For both, a dope comprising acetone and cellulose acetate was spun using the respective spinneret, a draw-down speed of about 350 m/min, a dope temperature of 72° C., an air temperature of 85° C., and an elongation of about 38-41%.

Figure 13:
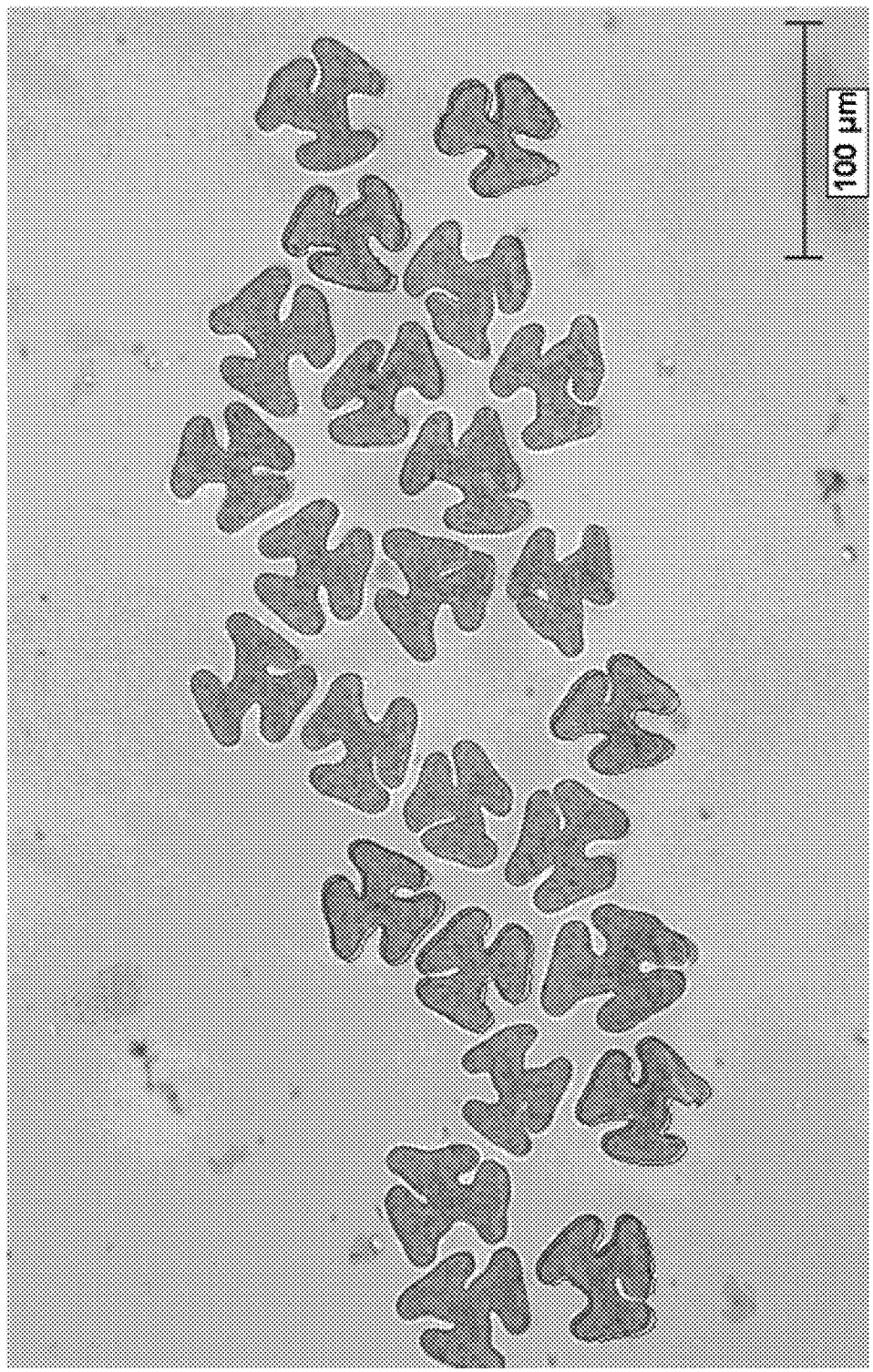
Figure 14:
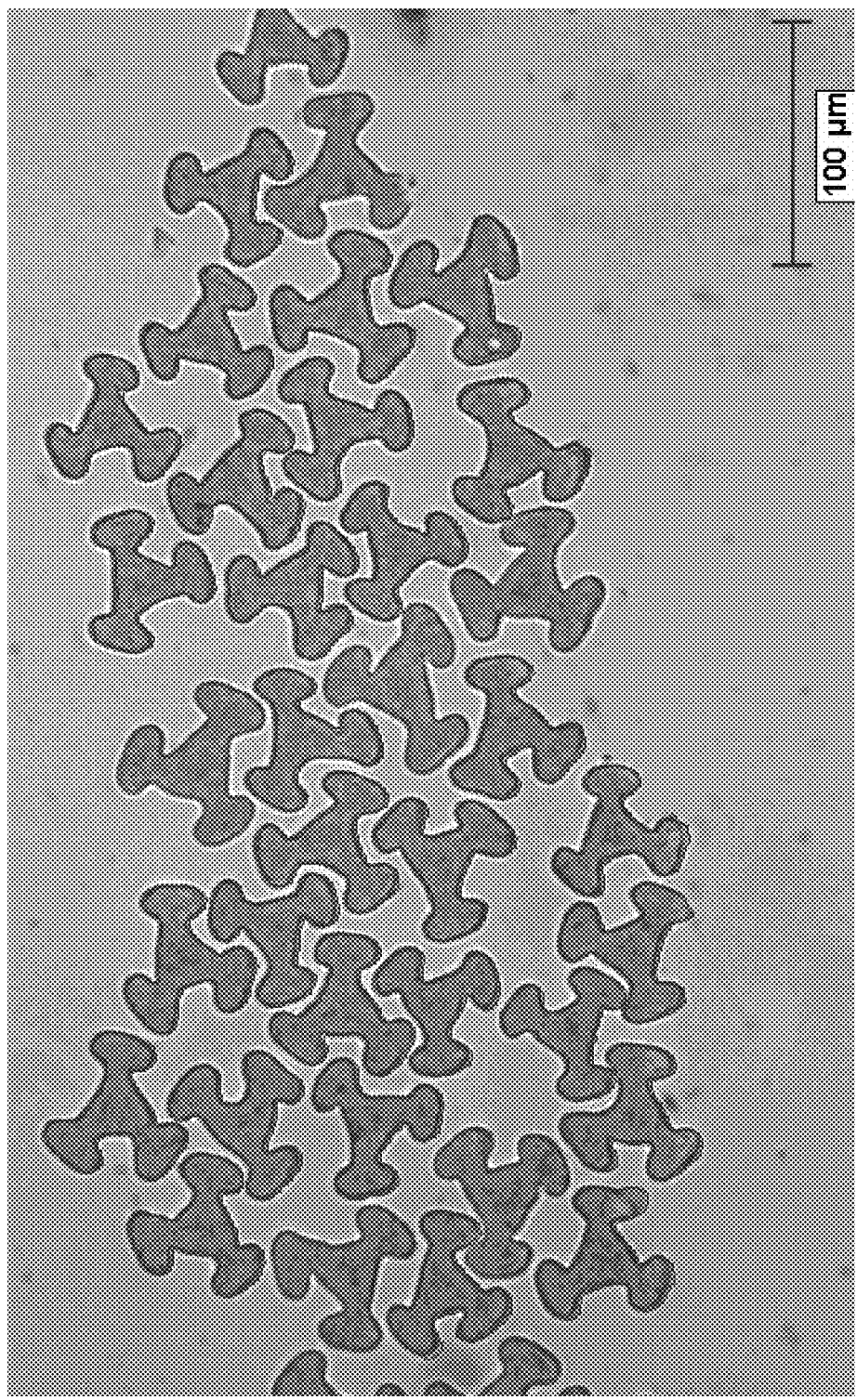

FIGS. 13-14 provide optical micrographs of the tri-arc G filaments and tri-arc H filaments, respectively. Specifically, FIG. 13 shows cross-sections of the produced tri-arc G filaments having three large bulbous tips. FIG. 14 shows cross-sections of the produced tri-arc H filaments having three bulbous tips that are slightly smaller than the tri-arc G filaments and have some arcing characteristic.

Comparing the tri-arc filaments an inter-arc angle ($\alpha$) of about 60° (A, C, E, and G) to the tri-arc filaments with an inter-arc angle ($\alpha$) of about 120° (B, D, F, and H), it appears, generally, that the 120° samples have a more distinct bulb at the end that does not transition as smoothly into the filament as the 60° samples. Further, the bulbs at the end of the tips of the 120° samples generally tend to have more arcing characteristic.

Additionally, comparing samples with the same arc angle, it appears that higher denier per filament samples retain a more uniform tri-arc shape.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a dope comprising a polymer and a solvent;
   passing the dope through a spinneret having a plurality of tri-arc holes that are a Y-shape with three prongs and each prong having an arc at an end of the prong that tapers from the end of the arc to a connection point of an adjacent arc; and
   spinning a plurality of tri-arc filaments having a generally Y-shape cross-section having bulbous or arcing tips.

2. The method of claim 1, wherein the polymer comprises at least one selected from the group consisting of cellulose acetate, cellulose diacetate, cellulose triacetate, cellulose propionate, cellulose butyrate, cellulose acetate-propionate, cellulose acetate-butyrate, cellulose propionate-butyrate, starch acetate, acrylonitrile, vinyl chloride, vinyl ester, vinyl ether, any derivative thereof, any copolymer thereof, and any combination thereof.

3. The method of claim 1, wherein the tri-arc filaments have a denier per filament of about 1 dpf to about 30 dpf.

4. The method of claim 1 further comprising:
   producing a tow band comprising at least some of the tri-arc filaments.

5. The method of claim 4 further comprising:
   crimping the tow band to yield a crimped tow band.

6. The method of claim 5 further comprising:
   conditioning the crimped tow band.

7. The method of claim 5 further comprising:
   baling the crimped tow band.

8. The method of claim 1, wherein the tri-arc filaments have a denier per filament of about 10 dpf to about 30 dpf.

9. The method of claim 1, wherein the tri-arc filaments have a diameter of about 10 microns to about 500 microns.

10. The method of claim 1, wherein the tri-arc filaments have a ratio of arc distance to inter-arc distance of about 0.2 to about 3.

11. The method of claim 1, wherein the polymer is present in the dope at about 20% to about 40% by weight of the dope.

12. The method of claim 1 further comprising:
    heating the dope to about 40° C. to about 100° C.

13. The method of claim 1 further comprising:
    applying a finish to the tri-arc filaments.

14. The method of claim 13, wherein the finish is a neat-finish.

15. The method of claim 4, wherein the tow band has about 1,000 to about 200,000 total denier.

16. The method of claim 4, wherein the tri-arc filaments have a denier per filament of about 10 dpf to about 30 dpf, and wherein the tow band has about 1,000 to about 20,000 total denier.

17. A method comprising:
    heating a dope comprising a polymer and a solvent to about 40° C. to about 100° C.;
    passing the dope through a spinneret having a plurality of tri-arc holes that are a Y-shape with three prongs and each prong having an arc at an end of the prong that tapers from the end of the arc to a connection point of an adjacent arc;
    spinning a plurality of tri-arc filaments having a generally Y-shape cross-section having bulbous or arcing tips, wherein the tri-arc filaments have a denier per filament of about 1 dpf to about 30 dpf; and
    producing a tow band comprising at least some of the tri-arc filaments.

18. A method comprising:
    providing a dope comprising a cellulose acetate and a solvent, wherein the cellulose acetate is present in the dope at about 20% to about 40% by weight of the dope;
    passing the dope through a spinneret having a plurality of tri-arc holes that are a Y-shape with three prongs and each prong having an arc at an end of the prong that tapers from the end of the arc to a connection point of an adjacent arc; and
    spinning a plurality of tri-arc filaments having a generally Y-shape cross-section having bulbous or arcing tips, wherein the tri-arc filaments have a denier per filament of about 10 dpf to about 30 dpf.

19. The method of claim 18 further comprising:
    producing a tow band comprising at least some of the tri-arc filaments, wherein the tow band has about 1,000 to about 20,000 total denier.

* * * * *